United States Patent [19]
Daniel

[11] Patent Number: 5,183,323
[45] Date of Patent: * Feb. 2, 1993

[54] FLAT PANEL ILLUMINATION SYSTEM

[76] Inventor: Maurice Daniel, 3115 King St., Alexandria, Va. 22302

[*] Notice: The portion of the term of this patent subsequent to Jun. 4, 2008 has been disclaimed.

[21] Appl. No.: 675,944

[22] Filed: Mar. 27, 1991

Related U.S. Application Data

[60] Division of Ser. No. 105,829, Oct. 8, 1987, Pat. No. 5,021,928, which is a continuation-in-part of Ser. No. 731,511, May 5, 1985, Pat. No. 4,715,700, which is a division of Ser. No. 427,155, Sep. 29, 1982, Pat. No. 4,519,017.

[51] Int. Cl.⁵ .................................................. F21V 8/00
[52] U.S. Cl. ...................................... 362/32; 362/806
[58] Field of Search ................. 362/32, 806, 31; 40/547; 350/96.1

[56] References Cited

U.S. PATENT DOCUMENTS

| | | | |
|---|---|---|---|
| 2,763,984 | 8/1988 | Awai et al. | 362/32 |
| 4,195,907 | 4/1980 | Zamja et al. | 350/96.1 |
| 4,234,907 | 11/1980 | Daniel | 362/32 |
| 4,234,910 | 11/1980 | Price | 362/32 |
| 4,510,555 | 4/1985 | Mori | 362/32 |
| 4,519,017 | 5/1985 | Daniel | 362/32 |
| 4,685,766 | 8/1987 | Nishimura et al. | 362/32 |
| 4,761,047 | 8/1988 | Mori | 362/32 |
| 4,845,596 | 4/1989 | Mouissie | 350/96.1 |
| 4,885,663 | 12/1989 | Parker | 362/32 |
| 5,021,928 | 6/1991 | Daniel | 362/32 |
| 5,036,435 | 7/1991 | Tokuda et al. | 362/32 |
| 5,042,892 | 8/1991 | Chiu et al. | 362/32 |

FOREIGN PATENT DOCUMENTS 0134308  5/1989  Japan ................ 350/96.1

Primary Examiner—Richard R. Cole
Attorney, Agent, or Firm—Sixbey, Friedman, Leedom & Ferguson

[57] ABSTRACT

The first panel illumination system includes a high intensity light source with a contoured reflector assembly for providing light to the input of an optical mixer and heat removal device. The optical mixer and heat removal device removes infrared radiation and transmits de-focused light to the input ends of a plurality of rectangular couplers connected to light conducting cables which are in turn connected to the light emitting optical fibers for a light emitting panel. These fibers are woven in accordance with specific weave ratio ranges and weave configurations to emit light uniformly across the extent of a light emitting fabric surface.

50 Claims, 13 Drawing Sheets

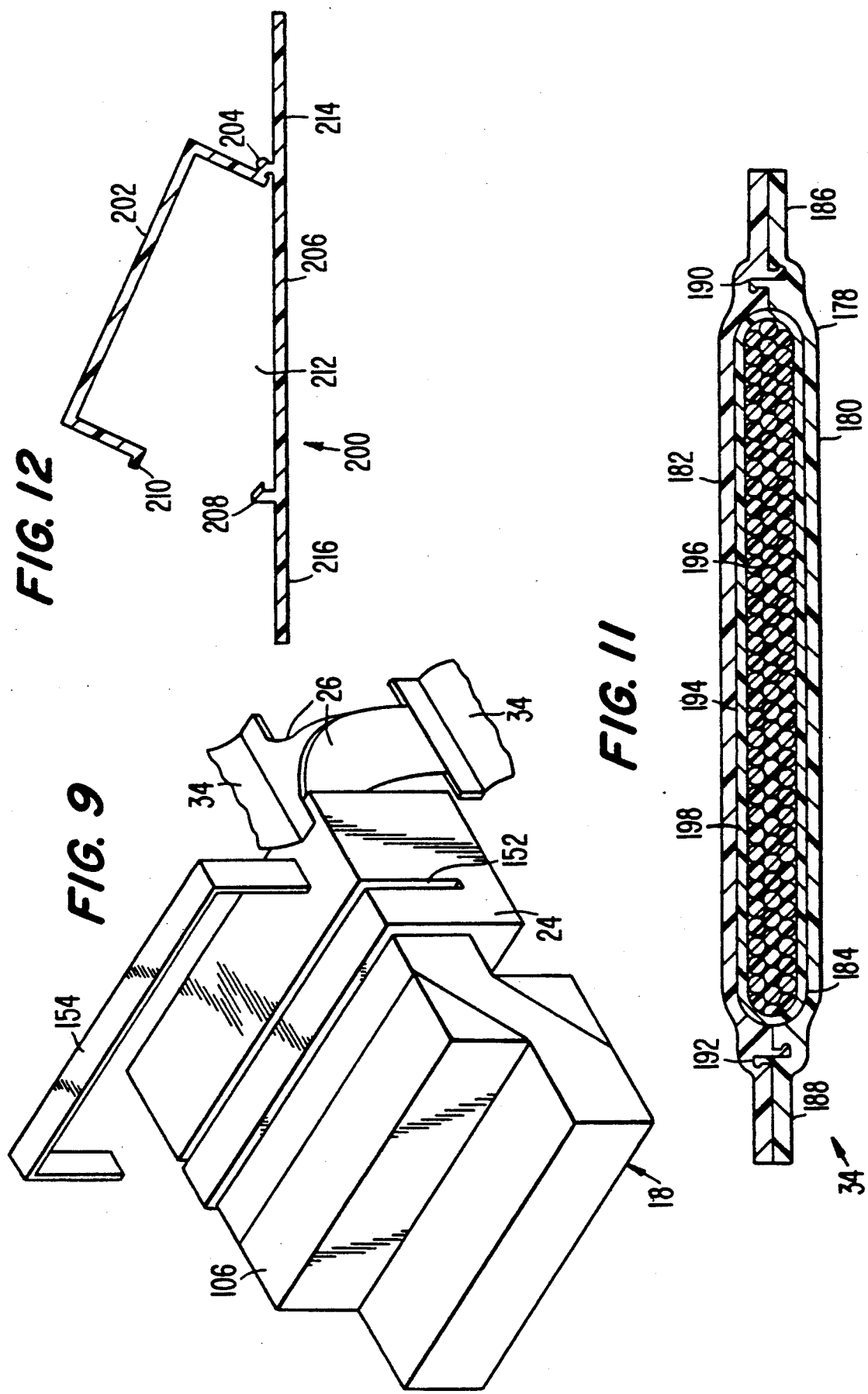

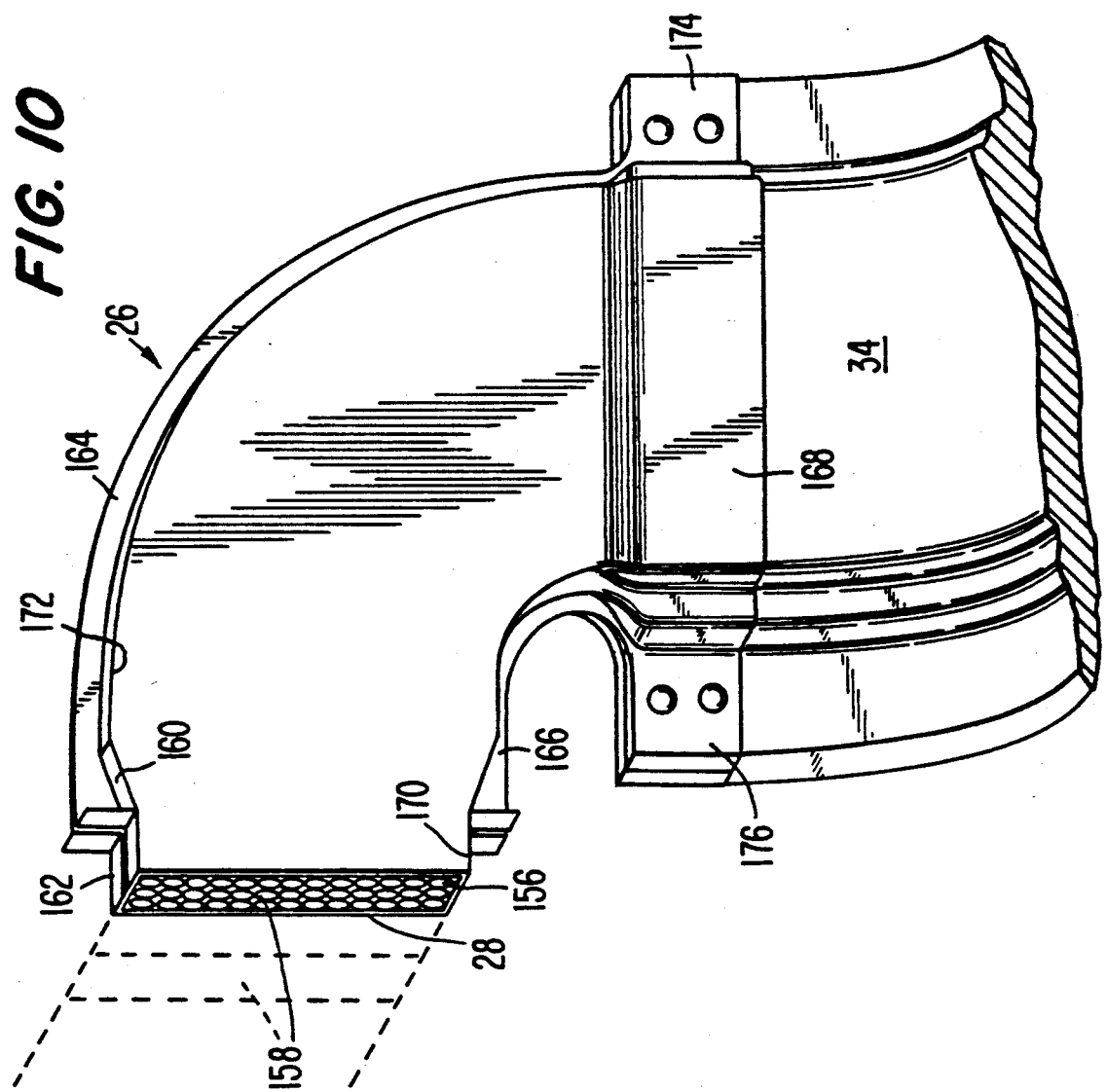

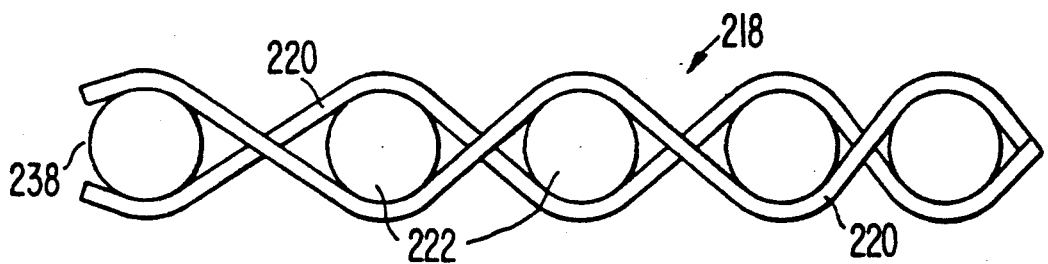
FIG. 18
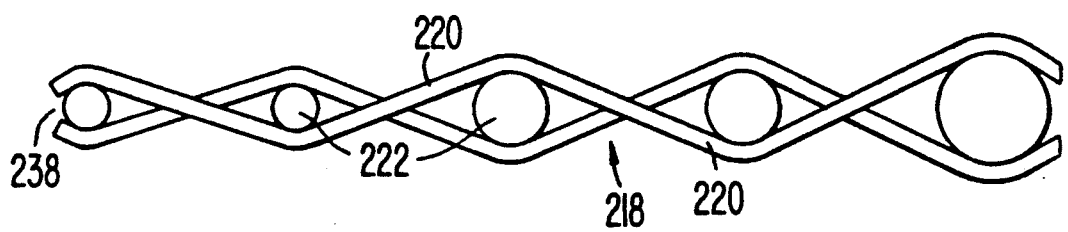
FIG. 19
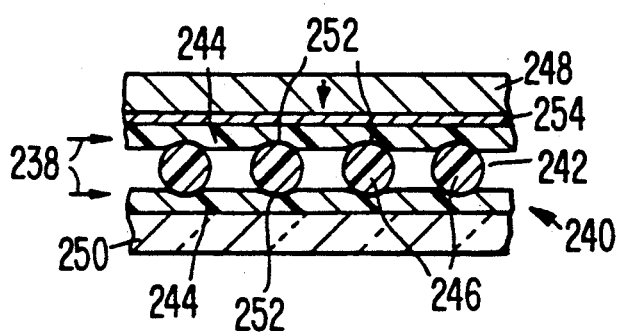
FIG. 20
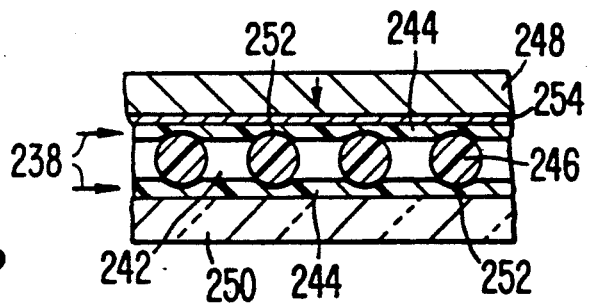
FIG. 21
FIG. 22
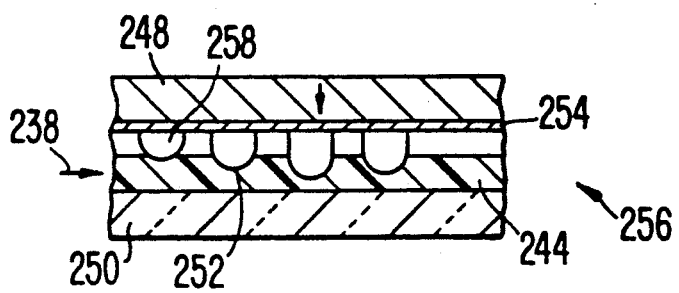

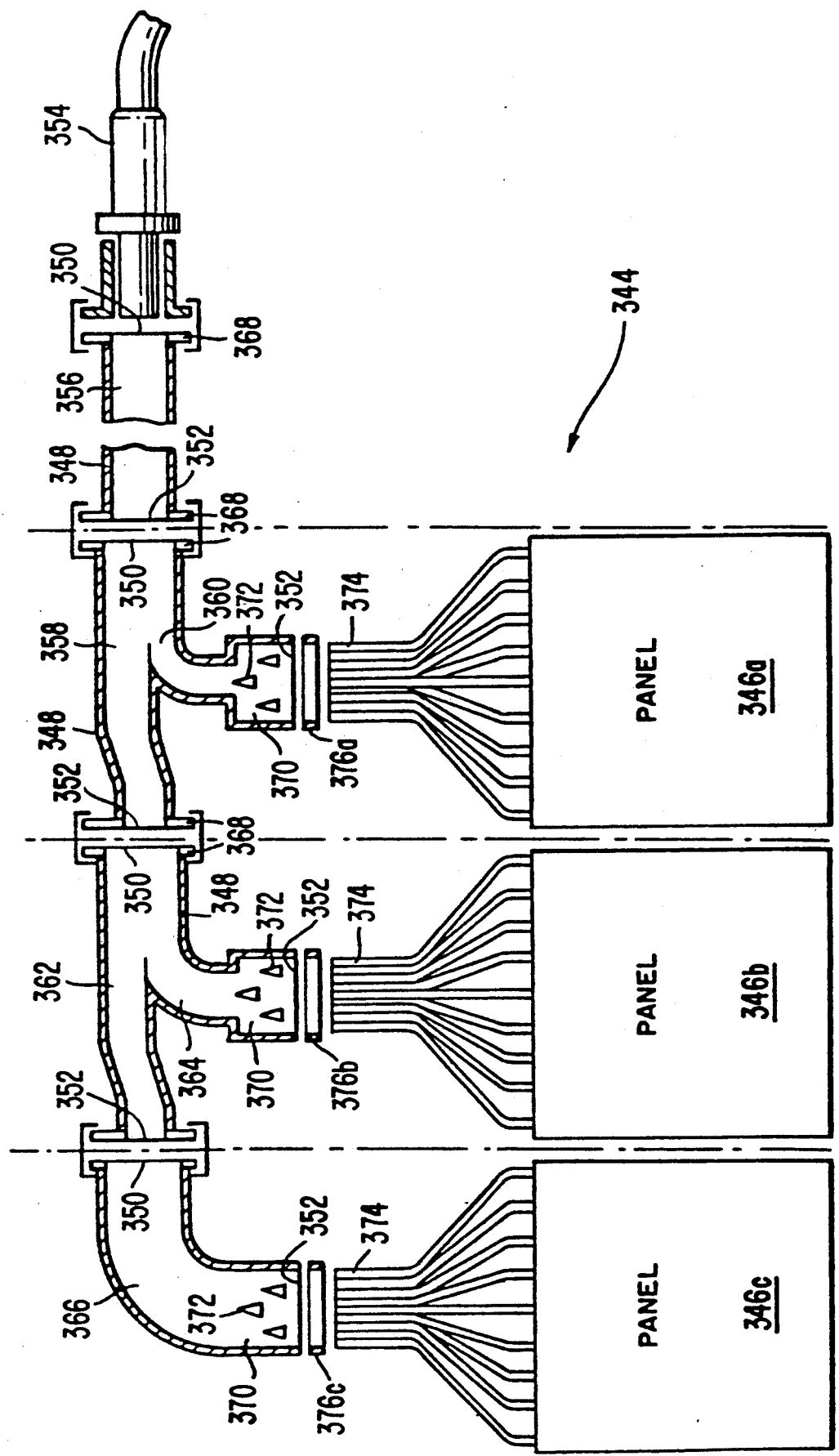

FLAT PANEL ILLUMINATION SYSTEM

This application is a divisional application of Ser. No. 07/105,829 filed Oct. 8, 1987, now U.S. Pat. No. 5,021,928 which is a continuation-in-part application of Ser. No. 731,511 filed May 5, 1985 now U.S. Pat. No. 4,715,700 and entitled "Light Emitting Optical Fiber Assemblies And Method For Forming The Same" which is a divisional application of Ser. No. 427,155 filed Sep. 29, 1982 now U.S. Pat. No. 4,519,017.

TECHNICAL FIELD

This invention relates to light emitting optical fiber assemblies generally and more particularly to fixtures and panels formed from an arrangement of light emitting optical fibers.

BACKGROUND ART

In recent years, a number of different methods have been developed for causing conventional optical fibers to emit light. U.S. Pat. Nos. 3,508,589 to B. N. Derick et al and 4,234,907 to M. Daniel disclose methods for causing clad or unclad optical fibers to emit light along the length of the fiber. This may be accomplished by scratching, abrading, chemically deforming, or otherwise removing or disturbing portions of the cladding of the optical fibers so that a small percentage of light traveling down the length of the fibers is emitted through the deformities in the cladding. Similarly, light emission may be achieved by providing optical fibers having a core region which is doped with refractive and/or reflective light scattering particles to provide enhanced, uniform light emission along the length of the optical fiber without the need for fiber deformation as disclosed in U.S. Pat. No. 4,466,697 to M. Daniel.

Panels with surfaces composed of light emitting woven optical fibers have been proposed by the aforementioned Derick et al and Daniel patents, while panels composed of strips of light conducting glass or plastic, such as described in U.S. Pat. No. 4,172,631 to Yevick, have been proposed as a means of producing a light emitting panel. However, panels constructed in accordance with these prior art methods have proven difficult to fabricate, since panels formed with light conducting glass or plastic strips require that each strip be cut with great precision. On the other hand, panels formed from woven light emitting optical fibers have never been developed to emit light uniformly and often have dark or shaded areas which extend across areas of the panel.

The technology dealing with light emitting optical fiber assemblies has, to this point, been directed toward obtaining light emission of any character along the length of a fiber and developing components which might ultimately find use in an assembly incorporating light emitting optical fibers. Thus, light sources have been designed which transmit light from a single point light source over a plurality of paths as shown by U.S. Pat. No. 4,222,091 to C. Bartenbach, and this has led to the transmission of light from a single source to a plurality of light transmitting cables as disclosed in U.S. Pat. Nos. 3,437,804 to V. Schaefer et al and 4,459,642 and 4,459,643 to K. Mori. These light source developments have led to the design of curved light paths eminating from a central hub, as shown by U.S. Pat. No. 3,567,917 to W. Daley, and ultimately to the spiral galaxy mirror light collection assemblies illustrated in U.S. Pat. No. 4,576,436 to M. Daniel.

Other optical components, such as the optical mixer disclosed in U.S. Pat. No. 4,523,257 to K. Mori, have been developed for use in optical systems, but such prior art units are not designed for combination with other optical components in a complete illumination system to maximize the efficiency of the system while providing uniform illumination. In an effective illumination system, focused light from a high intensity light source should be distributed by an effective reflector system onto the input aperture for an optical mixer which will provide a defocused light output. Both the reflector system and the optical mixer will often be required to have a heat dissipation capability, since excess heat will normally be generated by a high intensity light source.

To this point, optical fiber light emitting panels have been primarily experimental, and the requirements for a commercially acceptable panel have not been met. There is a great difference between the theoretical generalization that woven optical fiber might emit light and the production of commercially acceptable light emitting panels which will uniformly emit light from an extensive surface area. The generalization can be supported by small, hand woven patches of fabric formed from optical fibers, but the problems involved in providing light to a plurality of panel sections having a substantial surface area and causing the substantially uniform emission of light from these surface areas remain to be solved.

DISCLOSURE OF THE INVENTION

It is a primary object of the present invention to provide a novel and improved light assembly which includes light emitting optical fibers incorporated in a light emitting panel structure.

Another object of the present invention is to provide a novel and improved lighting assembly which includes woven multi-mode light emitting optical fibers forming a light emitting fabric which has a weave ratio within the range of from 8.5 to 37 dimensionless units.

A further object of the present invention is to provide a novel and improved light emitting fabric woven from light emitting optical fibers wherein the weave characteristics of the fabric are altered in areas of the fabric to provide substantially uniform light emission from the fabric surface.

Yet another object of the present invention is to provide a novel and improved lighting panel formed with a woven or nonwoven grid of light emitting optical fibers encapsulated in a refractive medium. The optical fibers are formed to emit light along their length into the encapsulating medium, and a scattering mechanism is provided to direct at least some of the light into the region beyond the panel.

A further object of the present invention is to provide a novel and improved lighting assembly employing light emitting fibers which are connected to receive electromagnetic energy from a lightpipe harness. This lightpipe harness is formed of a bundle of lightpipe rods which all begin at an input end and terminate at various output points. At least some portion of the rods are fused together with sufficient length to form an optical mixer, and the inside wall surface of the harness is made reflective to electromagnetic energy. The harness has one or more input optical windows and at least two or more optical output windows to direct electromagnetic radiation from a source means to points of usage.

Another object of the present invention is to provide a novel and improved lightpipe harness assembly formed from a bundle of lightpipe rods having a cross-sectional area which is constant along their respective lengths. The rods are all equal in cross-sectional area to provide an equal light output at a plurality of output points.

A further object of the present invention is to provide a novel and improved segmented lightpipe harness assembly for providing electromagnetic energy from a source to a plurality of optical fiber lighting units. This segmented lightpipe harness includes individual lightpipe rod sections which are split into two or more branches, each of which constitutes a subdivision of the initial section cross-sectional area. The ratio of the transmitted electromagnetic radiation intensity is determined by the ratio of the branch to rod section cross-sectional areas. The main branch of each rod section continues without change in cross-sectional area to the next section where the lightpipe means abruptly increases in area. The smaller secondary branch lines distribute the radiation to optical fiber light fixtures.

Still another object of the present invention is to provide a novel and improved flat panel illumination system including a plurality of light emitting panels which are each provided with light by one or more light transmitting cables. The end of each cable is connected to a rectangular coupler which, with a plurality of similar couplers, receives defocused light from an optical mixer. The mixer receives focused light from the multiple curved paths of a reflector designed to transmit the light from a single elongate light source.

A still further object of the present invention is to provide an optical mixer and heat dissipation unit formed from two or more light transmitting layers bonded together to form one or more optical interfaces. Each optical layer has a different index of refraction.

These and other objects of the present invention are accomplished by providing light to one or more light emitting panels from a single light source. This light source includes an elongate arc tube surrounded by a channel contoured reflector assembly which directs light through a plurality of curved channels to the input end of an optical mixer and heat removal device. The optical mixer and heat removal device operates to remove infrared radiation and de-focus the light entering the input end thereof and is formed from two or more light transmitting layers having different indexes of refraction and bonded together to form one or more optical interfaces. The output from the optical mixer and heat removal device is received by one or more rectangular connectors which incorporate optical fibers from flat optical fiber cables which either directly extend into a light emitting panel or are connected by means of a harness assembly to light emitting fibers in a light emitting panel. Each light emitting panel may incorporate either a light emitting fabric woven from light emitting optical fibers or nonwoven light emitting optical fibers in an encapsulating medium. The light emitting fabric may be woven with an unbalanced weave pattern with optical multi-mode light conducting fibers and multi-filament fill threads. The weave ratio for the light emitting fabric is between 13.5 to 37 dimensionless units. When multi-filament fill threads are woven with light conducting optical fibers, the weave ratio should be between 13.5 and 27 dimensionless units, but when monofilament fill threads are employed, the weave ratio will be between 8.5 and 17 dimensionless units. The weave of the light emitting fabric is altered to form pre-emitters in the area where the optical light conducting fibers enter the fabric and also in the areas of the fabric further removed from this entrance area to provide uniform light emission across the fabric surface. This may be accomplished by varying the diameter of the fill threads, varying the spacing between the fill threads, or a combination of the two. The light emitting fabric by itself, mounted on a backing, or encapsulated with a reflector may be used to form a panel, and such panel may be placed behind the indicator for an instrument to provide effective back lighting.

BRIEF DESCRIPTION OF THE DRAWINGS

FIG. 9 is a perspective view showing the female receptacle for coupling the rectangular connectors to the optical mixer and heat removal device for the flat panel illumination system of the present invention;

FIG. 10 is a perspective view of a rectangular connector for the flat panel illumination system of the present invention;

FIG. 11 is a sectional view of the flat optical fiber cable for the flat panel illumination system of the present invention;

FIG. 12 is a sectional view of a sheath for the flat optical fiber cable used in the flat panel illumination system of the present invention;

FIG. 18 is a diagrammatic view showing a variation in the weave pattern for the woven light emitting fabric of the present invention;

FIG. 19 is a diagrammatic view showing a second variation in the weave pattern for the woven light emitting fabric of the present invention;

FIG. 20 is a sectional view of a light emitting panel incorporating nonwoven light emitting fibers of the present invention;

FIG. 21 is a sectional view of a second embodiment of a light emitting panel incorporating nonwoven light emitting fibers of the present invention;

FIG. 22 is a sectional view of a third embodiment of a light emitting panel incorporating nonwoven light emitting fibers of the present invention;

FIG. 29 is a partially sectional diagram illustrating a segmented lightpipe harness assembly for a plurality of light emitting optical fiber units.

BEST MODE FOR CARRYING OUT THE INVENTION

Figure 1:
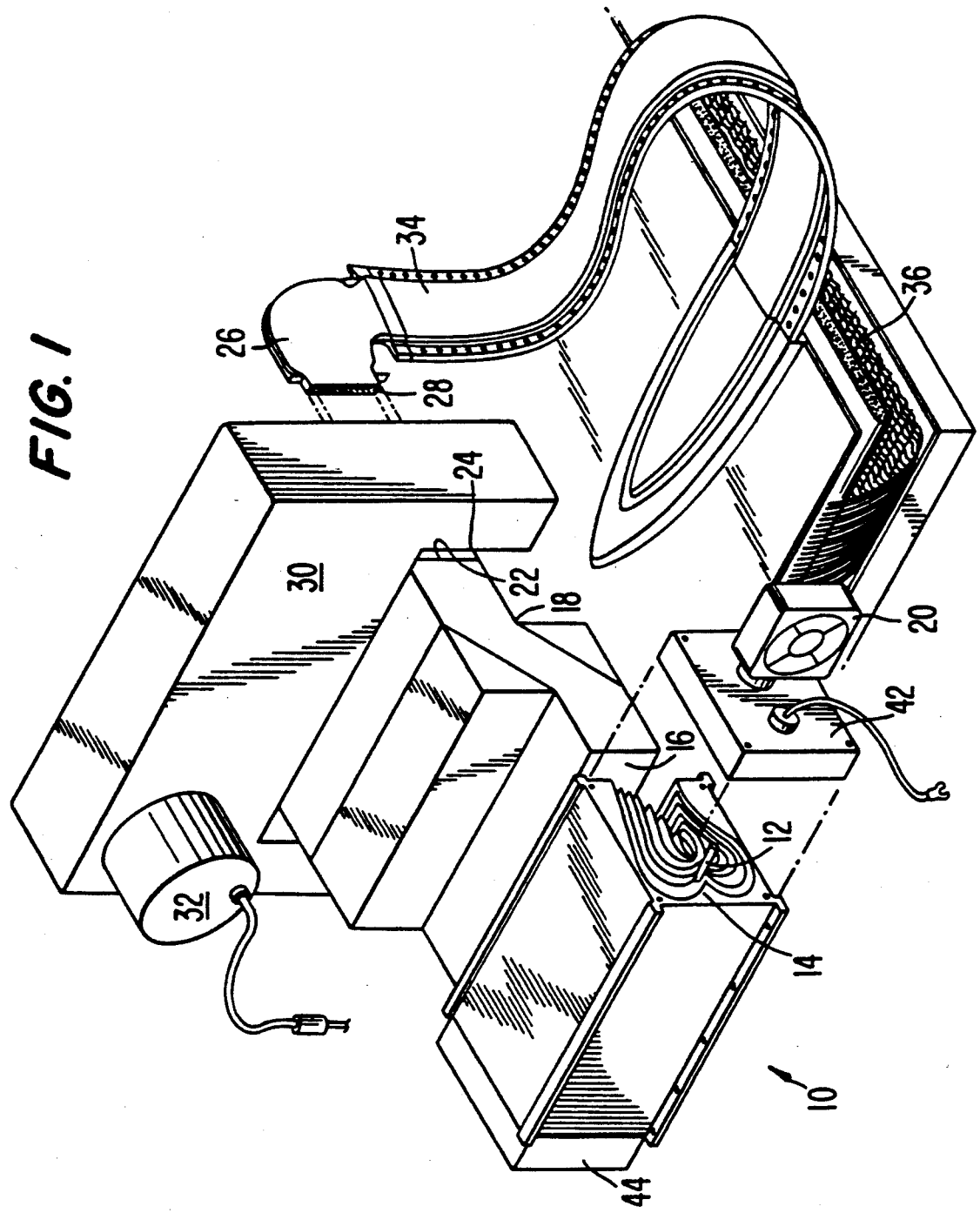
FIG. 1 is a perspective exploded view of the flat panel illumination system of the present invention.

The flat panel illumination system of the present invention indicated generally at 10 consists of an assembly of novel optical components which operate in combination to provide enhanced and substantially uniform illumination from an optical fiber panel. The flat panel illumination system 10 includes an arc tube light source 12 which is preferably a high pressure sodium arc tube or metal halide arc tube. The light source 12 is surrounded by a channel contoured reflector assembly 14 which directs light from the light source to the input end 16 of an optical mixer and heat removal device 18. A fan 20 directs air through the channel contoured reflector assembly to reduce the internal temperature thereof when the arc tube light source 12 is in operation.

The optical mixer and heat removal device 18 operates to de-focus the light entering the input end 16 and to spread the light so that it exits an output end 22 for the optical mixer and heat removal device in substantially a uniform manner. Also, the optical mixer and heat removal device directs infrared radiation in a different direction from the visible radiation, thereby removing heat from the radiation.

A female receptacle 24 is attached at the output end of the optical mixer and heat removal device 18, and this female receptable is adapted to receive a plurality of rectangular connectors 26. Each rectangular connector has an optical input end 28, and normally the female receptacle 24 will provide a gap or slot between the output end 22 of the optical mixer and the optical input ends 28 of rectangular connectors 26 received in the female receptacle. This gap is adapted to receive the colored film of a color effects cartridge 30 which may be optionally provided to attribute color effects to the flat panel illumination system. This color effects cartridge includes a cartridge drive motor 32 which may be connected to a suitable source of electricity.

The rectangular connectors 26 are each combined with a flat optical fiber cable 34 to transmit light from the output end 22 of the optical mixer and heat removal device 18. The rectangular connectors are formed to permit side-by-side stacking thereof across the output end of the optical mixer and heat removal device to effectively capture substantially all of the light present at this output end. This light is transmitted by means of the flat optical fiber cable to a light emitting fabric panel 36.

Figure 2:
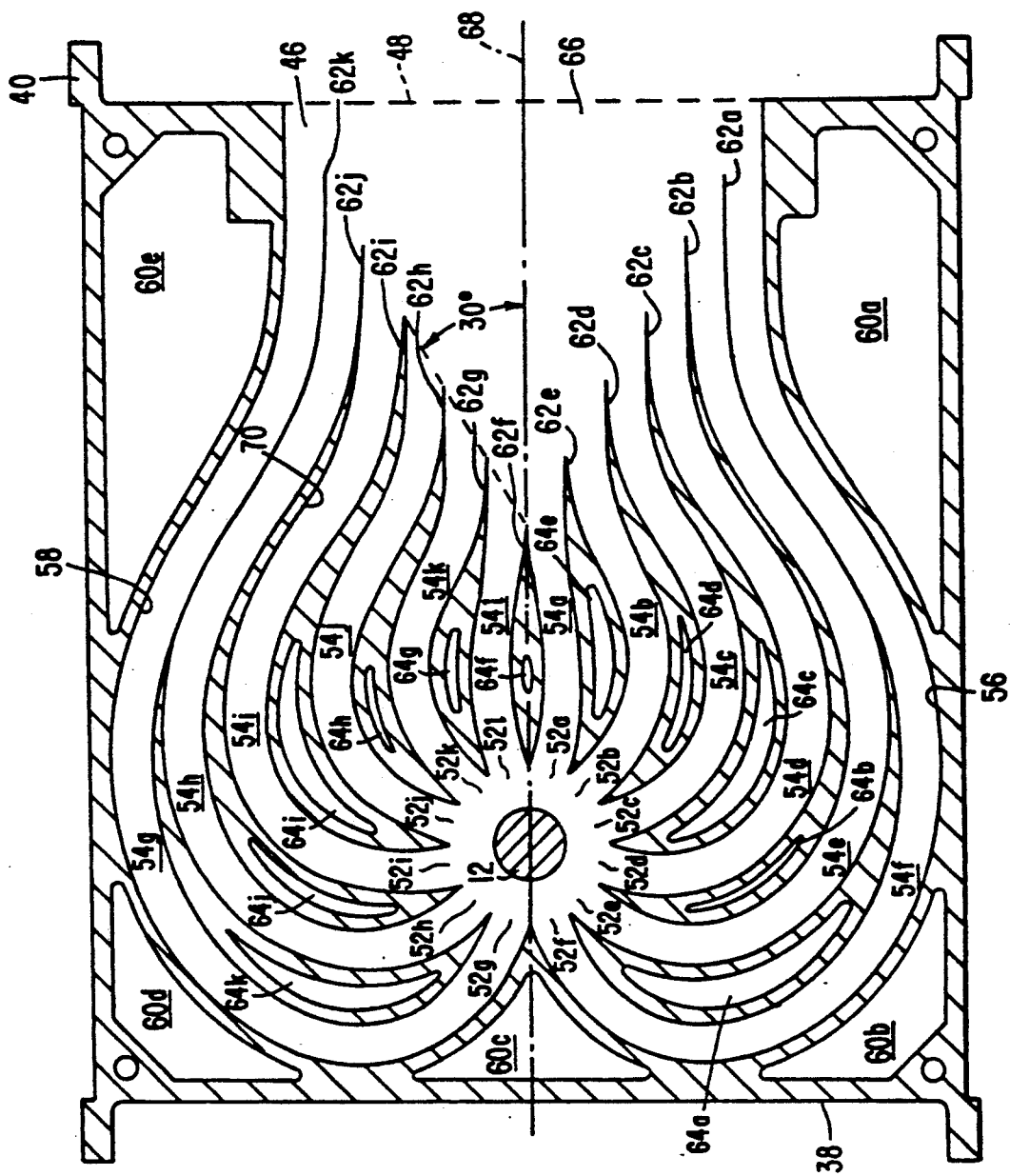
FIG. 2 is a sectional view of the light source and channel contoured reflector for the flat panel illumination system of the present invention.

Referring now to FIG. 2, the channel contoured reflector assembly 14 includes an outer housing 38 provided with mounting flanges 40 which permit the housing to be secured to the input end 16 of the optical mixer and heat removal device 18. The open ends of the outer housing are closed by end caps 42 and 44 (FIG. 1) having inner surfaces formed to be light reflective. With the end caps in place, the housing 38 is completely enclosed except for an opening 46 which provides a light transmitting output aperture for the housing. Normally, this light transmitting output aperture would be closed by the input end 16 of the optical mixer and heat removal device 18, but in instances where the channel contoured reflector assembly is used without the optical mixer and heat removal device, the output opening 46 will be closed by a sheet of glass indicated in broken lines at 48 having an interference type heat reflecting coating.

The arc tube light source 12 is mounted within the housing 38 so as to extend between the end caps 42 and 44. Preferably, a sodium arc tube light source 12 is employed which, for example, conventionally includes a cylindrical quartz tube measuring $\frac{3}{8}$ inch in diameter and having a length proportional to the wattage of the lamp. For example, the quartz tube may measure 10.8 inches in length for a conventional 1500 watt high pressure sodium arc tube. Other long cylindrical light sources can also be used, such as low pressure arc tubes, metal halide arc tubes, and even long filament tungsten halogen incandescent lamps.

The elongated sodium arc tube 12 provides the core for a spiral mirror assembly of the type completely disclosed and claimed in my U.S. Pat. No. 4,576,436, the disclosure of which is incorporated herein by reference As illustrated in FIG. 2, the arc tube is surrounded by input openings 52a–52l to spiral light conducting channels 54a–54l. These input openings are spaced from the outer periphery of the arc tube 12 for a distance within the range of from one to three times the radius of the arc tube as measured from the center thereof. Each of these input openings provides light input to a spiral channel having a uniform cross-sectional area along its length. These channels 54a–54k extend in width across the housing 38 so as to be substantially equal in width to the length of the arc tube light source 12.

The outer walls 56 and 58 of the spiral light conducting channels 54f and 54g respectively are formed integrally with the outer housing 38. It will be noted that these channel outer walls cooperate with the outermost walls of the outer housing 38 to define passages 60a–60e. These passages provide a passageway for cooling air from the fan 20, or in cases where the fan is replaced by a hydraulic cooling system, for the passage of cooling fluid.

The spiral light conducting channels 54a–54l are defined by a nested set of channels spacers 62a–62k.

These channel spacers extend for the full length of the arc tube light source 12 and are supported at either end by the end caps 42 and 44. The end caps may be provided with grooves on the inside surfaces which match the cross-sectional shape of the channel spacers 62a-62k and which receive the ends of the channel spacers when the end caps are bolted into place. It will be noted that at least portions of the channel spacers are hollow to provide internal passages indicated at 64a-64k, and these internal passages provide cooling passages for air or liquid through the channel spacers. It will be noted from FIG. 1 that the end caps 42 and 44 are relatively thick, and these end caps have double walls so that an interior closed space is provided in each end cap. The fan 20 communicates with the interior closed space of the end cap 42, and apertures are provided in the innermost wall of this end cap to permit air to communicate with the passages 60a-60e as well as the internal passages 64a-64k in the channel spacers 62a-62k. Similar communicating apertures are provided in the innermost wall of the end cap 44 so that a complete cooling path is provided.

All external surfaces of the channel spacers 62a-62k are formed to reflect light, as are the innermost surfaces of the outer walls 56 and 58 and the innermost surfaces of the inner wall on the end caps 42 and 44. Thus, all four walls of the spiral light conducting channels 54a-541 are light reflective, and each channel keeps the cross-sectional area of the light beam passing therealong from increasing during its travel.

It will be noted that the length of each spiral-like conducting channel 54a-541 varies according to its starting position around the arc tube light source 12, and the length of the channels progressively decreases from the outermost channels 54f and 54g to the centermost channels 54a and 541. This results in the formation of an optical mixing cavity 66 positioned directly before the opening 46 which is substantially triangular in cross-section. The glass 48 or the input surface of the optical mixer and heat removal device 16 forms the base of this triangular optical mixing cavity. It will be noted that the ends of the channel spacers 62a-62k are arranged to form an angle of approximately 30° with a horizontal centerline 68 extending centrally through the arc tube light source 12 and the output opening 46. This assures that a maximum amount of light passing outwardly from the opening 48 is directed at an angle of less than 30°. It should be noted here that the reflective channel spacers are exactly twice the distance of the arc tube radius from the center of the arc tube. This geometry causes all the light entering the channels to have an angular divergence of ±30° or less which is required by the optical fibers. This spacing determines the angular divergence and can be changed if required by different optical fibers.

The spiral light conducting channels 54a-541 are formed substantially in accordance with the teachings of my U.S. Pat. No. 4,576,436 with the exception that some modification is provided at the output end of each channel. Initially, the light entering each spiral light conducting channel is reflected from only one surface of the channel during its travel, and the angle made between the light ray and the spiral mirror surface of the channel continues to decrease as the light ray orbits through the channel. This decreasing angle of incidence causes the light beam to become increasingly collimated as it moves along the orbit, but unlike the spiral light conducting channels previously disclosed, the light conducting channels 54a-541 are bounded on all sides by light reflecting surfaces and have a reverse curvature adjacent the output end thereof as indicated at 70 with respect to the channel 54i. This reverse curvature causes the light beam to be deflected downwardly from the reflective surface upon which it previously impinged a plurality of times to the opposite surface in a manner which will cause the light to exit the spiral light conducting channel in a manner substantially parallel to the centerline 68. This causes some divergence of the light beam but assures that a maximum amount of light passes through the output aperture 46 at an angle which will minimize loss of light entering a subsequent optical device.

When the channel contoured reflector assembly 14 is assembled with the optical mixer and heat removal device 18, the spiral light conducting channels 54a-541 and the optical mixing cavity 66 are hermetically sealed from the outside atmosphere and from the cooling passages 60a-60e and 64a-164k. The optical mixing cavity is then evacuated and filled with an inert mixture of gases similar to those normally found inside the outer glass envelope of a high pressure sodium lamp. This serves to prolong the life of the sodium arc tube light source 12 and to keep dust and dirt from diminishing the reflectivity of the reflective surfaces in the spiral light conducting channels 54a-541.

The spiral light conducting channels 54a-541 may be provided in varying numbers and in different configurations. It will be noted that each channel increases in curvature in the direction away from the arc tube light source 12 until it reaches the reverse curvature portion adjacent the channel output. Any desired number of channels can be employed, and the number of channels can be decreased to reduce the large aperture proximity losses which occur. For example, an odd number of channels can be used in which the odd channel lies along the centerline 68 directly between the light source and the output opening 46, thus reducing the angular divergence of the output light and reducing the amount of reflectivity losses. Also, instead of directing all channels to a single output opening 46, it is possible to provide more than one output for the channel contour reflector assembly 14 and to divide light channels between these plural outputs. For example, having two outputs facing opposite directions sometimes helps to reduce the length of optical fiber cables needed in multipanel systems, thus reducing the optical losses in the cables.

Figure 3:
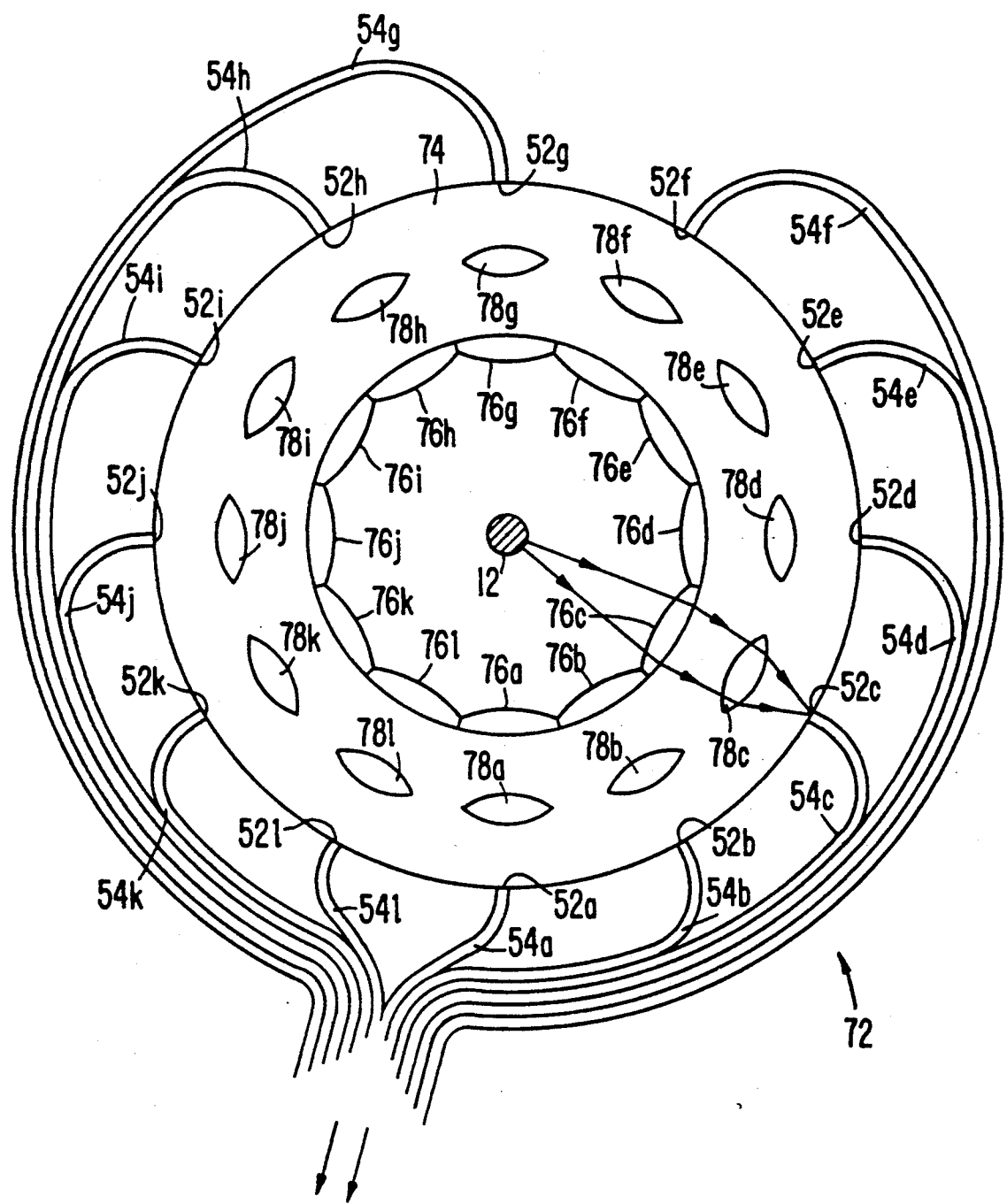
FIG. 3 is a sectional view of a second embodiment of the light source and channel contoured reflector used in the flat panel illumination system of the present invention.

FIG. 3 illustrates a channeled reflector with lens assembly indicated generally at 72 which is an embodiment of the channel contoured reflector assembly 14. The channel reflector with lens assembly includes a circular mount 74 which surrounds and is spaced from the arc tube light source 12. This circular mount supports an inner ring of lenses 76a-761 and an outer ring of lenses 78a-781 which are spaced from the inner ring. The lenses 76a-761 and 78a-781 constitute single or plural lenses arranged to extend for the length of the arc tube light source 12, and are mounted on the circular mount 74 in such a manner that an unobstructed optical path is provided from the arc tube through a pair of lenses to one of the spiral light conducting channels 54a-541 which are adjacent the circumference of the circular mount 74. As is illustrated in the case of the inner lens 76c, the outer lens 78c, and the spiral light conducting channel 54c, light from the arc tube source 12 passes through a lens on both the inner ring and outer ring of lenses and is focused thereby upon an input opening for one of the spiral light conducting channels. It will be noted that the lenses 76a–76l in the inner ring of lenses are positioned so that each lens touches the adjacent lens on opposite sides thereof to capture all of the light emerging from the arc tube light source 12. The lenses in the outer ring of lenses 78a–78l serve to focus the light down to an image which is smaller than the input opening 52a–52l of the spiral light conducting channels, while at the same time keeping the angular divergence of the light to within the 60° cone required by optical transmission elements.

The channel reflector with lens assembly 72 permits the light channels and two rings of focusing lenses to be spaced a considerable distance from the arc tube light source 12, thereby preventing damage to the focusing assembly due to the extreme heat of the arc tube light source. Also, the two rings of lenses 76 and 78 can be provided with an inner hot mirror coating which reflects heat back toward the arc tube while passing and focusing visible light. In fact, the convex inner surface of the lenses forming the rings 76 and 78 can be designed and given a hot mirror coating such that the heat is exactly focused back upon the arc tube light source 12, thus increasing the efficiency of the arc tube.

Figure 4:
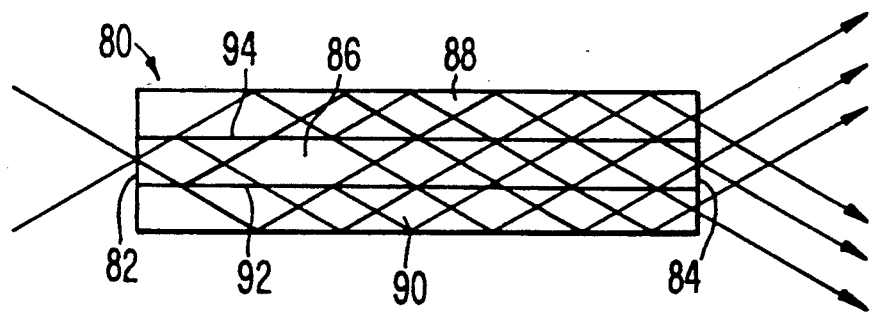
FIG. 4 is a diagrammatic view of an optical mixer for the flat panel illumination system of the present invention.
Figure 5:
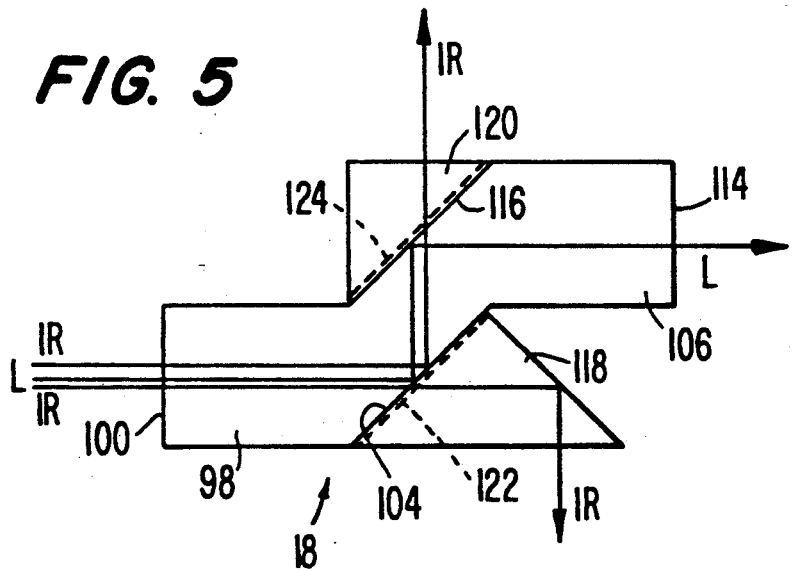
FIG. 5 is a diagrammatic view of an optical mixer and heat removal device for the flat panel illumination system of the present invention.

FIGS. 4 and 5 illustrate the structure of the optical mixer and heat removal device 18 of FIG. 1. It is generally desirable to provide an optical mixer between a focused light source, such as the light emitted from the spiral light conducting channels 54a–54l, and the input window to an optical fiber cable. An optical mixer serves to de-focus the light entering the optical fiber cable so that light will be spread uniformly across the many optical fiber ends for the fibers which form the cable so that all fibers will transmit substantially the same intensity of light. If an optical mixer is not used in combination with a focused light source, the light impinging upon the center of the optical fiber cable may be many times greater in intensity than the light near the edges of the cable input. Not only will this concentration of light cause uneven illumination of optical fiber systems served by the cable, but it also may cause destruction of the center portion of the cable where intense light is focused.

The optical mixer portion of the optical mixer and heat removal device 18 is fabricated from a plurality of glass elements which have a different index of refraction. Each time light crosses the interface between glass sections having different indexes of refraction, some light is reflected from the boundary while the remainder passes through. When an optical mixer is formed from an elongated element having an input window, an output window, and at least one boundary layer between two glass sections having a different index of refraction, the light beam passing from the input window to the output window crosses the boundary between the two glass sections a number of times. Thus, at each crossing the beam is split up into a number of secondary light beams that follow different paths on their way to the output window of the optical mixer, and the highly focused original light is split up by this arrangement into a large number of secondary beams which eventually diffuse the original beam uniformly over the output window of the optical mixer.

The diffusion of the original input light beam to the optical mixer of the present invention can be increased by increasing the number of interfaces between regions of differing indexes of refraction. It is important, however, that all interfaces must be parallel to the longitudinal or Z axis of the optical mixer, for interfaces which are not parallel to the Z axis will cause rapid increases in the angular divergence of the light. Light with an angular divergence which has increased beyond the critical angle of conventional optical fibers (about 30° from the Z axis) will not be transmitted through the optical fiber cable which receives light from the optical mixer and thus, will be lost. The cross-section of all layers of the optical mixer must remain constant throughout the length of the mixer, and the mixer must be straight. If the optical mixer changes in cross-sectional geometry or is curved instead of straight, the unit will increase the angular divergence of light passing therethrough and consequently result in light loss.

The basic construction of an optical mixer formed in accordance with the present invention is illustrated by the diagram of FIG. 4. Here, a mixer indicated generally at 80 includes an input window 82 and an output window 84. This mixer consists of three rectangular slabs of high-quality optical glass which are glued together by a comparatively lower index of refraction, high-quality optical glue. The innermost slab 86 has a lower index of refraction than the two outermost slabs 88 and 90, as it has been found that with this optical arrangement, light will diffuse into the regions having a comparatively higher index of refraction. The interfaces between the slabs 86, 88 and 90 are formed by a glue-glass boundary indicated at 92 and 94. Thus, as indicated from the diagram in FIG. 4, a highly focused input beam at the input window 82 passes into the mixer 80 and is multiplied as it both passes through and reflects from the interfaces 92 and 94. By arranging the layers of glass in accordance with their associated indexes of refraction, a highly focused input light beam at the input window 82 can be evenly diffused across the output window 84. The diffusion of the original input light can be increased by increasing the number of interfaces between regions of differing indexes of refraction. However, as previously indicated, all of these interfaces must be parallel to the longitudinal or Z axis of the optical mixer, and the glass layers making up the optical mixer must be straight and of uniform cross-sectional area along their lengths. The optical mixer would also be coated on all sides with a transparent protective coating made of polystyrene, plastic, or glass or the like which has a low index of refraction. This cladding serves to retain the light within the mixer by total internal reflection even when dust, mounting brackets and other non-optical elements come in contact with the mixer surface.

Figure 6:
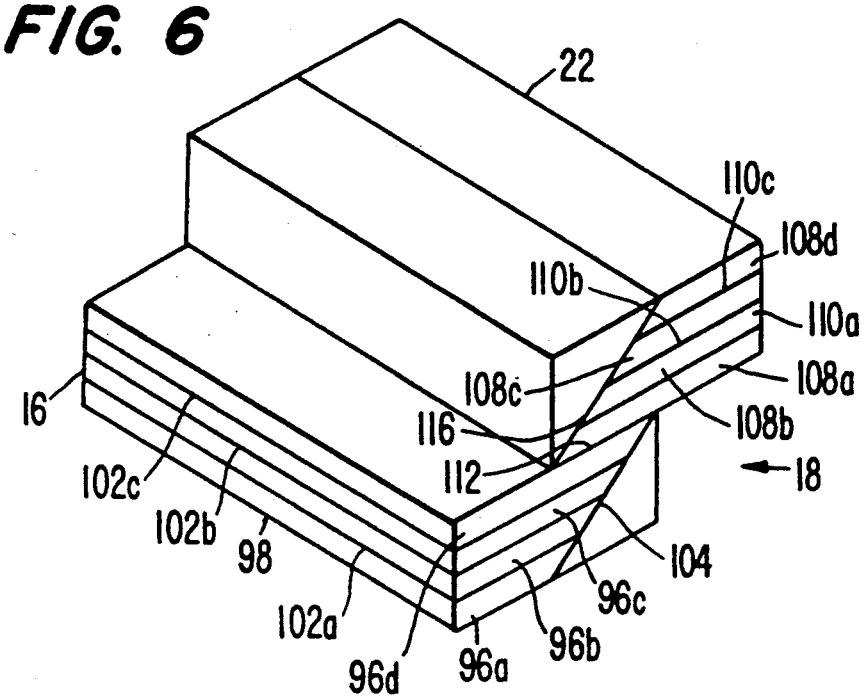
FIG. 6 is a perspective view of the optical mixer and heat removal device of FIG. 5.

Employing the teachings disclosed in the basic optical mixer 80 of FIG. 4, the optical mixer and heat removal device 18 of FIGS. 5 and 6 may be constructed. The optical mixer portion of this device is formed by four layers of optical glass 96a–96d which form an input section 98 having an optical input window 16. The layers of optical glass 94a–94d are secured together by optical glue having a lower index of refraction to form interfaces 102a–102c. It will be noted that the end of the input section 98 opposite the input window 100 is angled to incline away from the input window as indicated at 104.

The optical mixer and heat removal device 18 includes an output section 106 which, like the input section, is formed from four superimposed layers of optical glass 108a–108d. These layers are joined by optical glue to provide interfaces 110a–110c. Additionally, the lower surface of the layer 108a is secured by optical glue to the upper surface of the layer 96d to provide an interface 112 between the input and output sections. It will be noted that the area of contact between the layers 108a and 96d is spaced from the input window 100 so that the output section 106 is superimposed on the input section 98 at a point above the inclined end 104.

The output section 106 includes an output window 22 which provides the diffused light output from the optical mixer and heat removal device 18. It will be noted that the wall of the output section which is opposite to the output window is an angled wall 116 which extends substantially parallel to the inclined end wall 104 of the input section.

With the exception of the input window 16, the output window 22, and the angled walls 104 and 116, the input and output sections of the optical mixer are coated with a transparent protective plastic or glass coating or cladding, as was the optical mixer 80. As indicated by FIG. 1, the input window 16 extends across the output opening 46 of the channel contoured reflector assembly 14 and the mounting flanges 40 engage the external surfaces of the input section 98 adjacent the input window. Since the light emitted at the center of the optical mixing cavity 66 is of greater intensity than that emitted at the periphery of the optical mixing cavity, due to the shorter length of the spiral light conducting channels opening at the center of the optical mixing cavity, the optical mixer for the optical mixer and heat removal device 18 is designed to compensate for this higher intensity of received light. To accomplish this, the innermost layers 96b, 96c, 108b and 108c of the optical mixer have a lower index of refraction than the outermost layers 96a, 96d, 108a and 108d. As an example, the two innermost layers of the optical mixer may have an index of refraction of 1.55, the outermost layers may have an index of refraction of 1.60, the interface glue layers may have an optical index of refraction of 1.50, and the protective cladding may have an optical index of refraction of 1.35.

To complete the optical mixer and heat removal device 18, two 45° cold mirrors 118 and 120 are secured by optical glue or other means to the inclined walls 104 and 116, respectively. Cold mirrors of the type used for the mirrors 118 and 120 are known radiative heat removal devices for optical systems, and these mirrors, when placed in the path of a light beam, direct infrared radiation in a different direction than the visible radiation. A cold mirror is designed to transmit infrared radiation while reflecting visible radiation, and a 45° cold mirror is designed to operate when positioned at a 45° angle with respect to the incident light beam. The angled surface 104 of the optical mixer portion for the optical mixer and heat removal device 18 is designed to position a surface 122 of the cold mirror 118 at an angle of substantially 45° to the longitudinal axis of the input section 98. Similarly, the inclined wall 116 is designed to position a surface 124 of the cold mirror 120 at an angle of 45° to both the longitudinal axis of the output section 106 as well as to the central optical axis of light reflected from the surface 122. As illustrated by FIG. 5, the light passing into the input window 16 includes visible light components L as well as infrared components IR. The surface 122 of the cold mirror 118 passes infrared radiation which is directed out of the cold mirror while reflecting visible radiation onto the surface 124 of the cold mirror 120. The surface 124 again passes whatever infrared radiation remains outwardly while reflecting visible light into the output section 106. For purposes of illustration, the light path shown in FIG. 5 is straight, but in effect, the light path through the optical mixer will actually follow a path more in the order of that shown by FIG. 4. Thus, the optical mixer and heat removal device 18 diffuses the visible light entering the input window 16 and spreads it evenly over the output window 22 while removing heat from the light beam. In cases where a light source is used in place of the arc tube light source 12 which does not emit the heat characteristic of the arc tube light source, the optical mixer and heat removal device 18 may be replaced by a basic straight line optical mixer of the type illustrated at 80.

Figure 7:
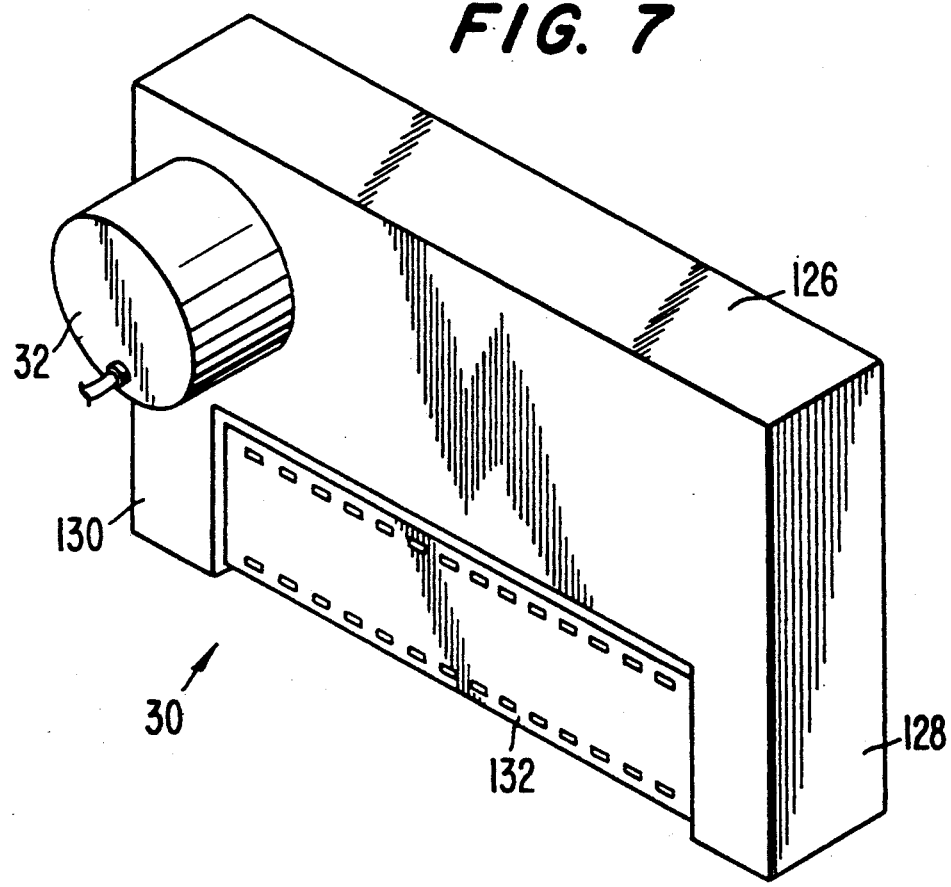
FIG. 7 is a perspective view of a color effects cartridge for the flat panel illumination system of the present invention.
Figure 8:
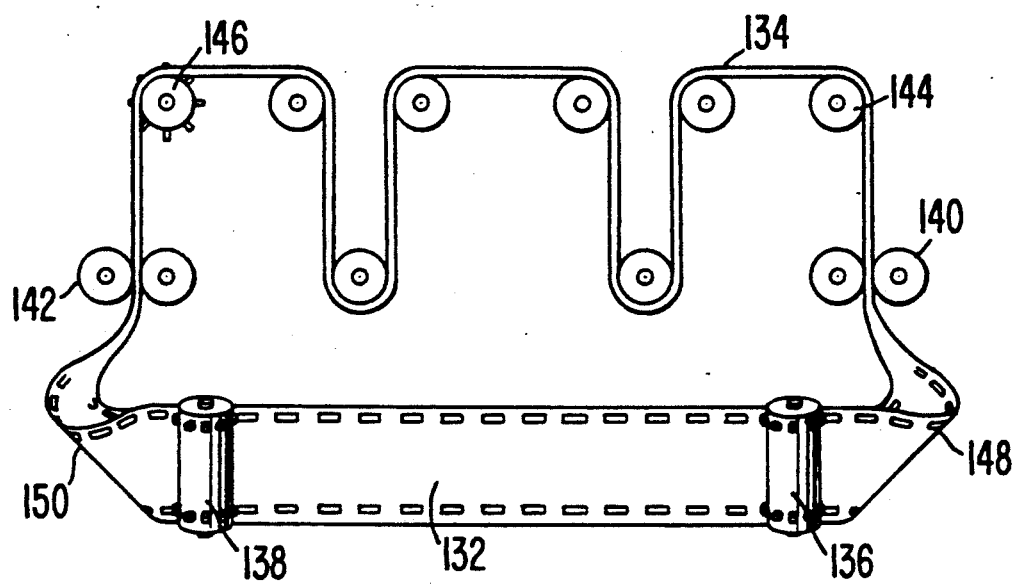
FIG. 8 is a diagrammatic view showing the film path through the color effects cartridge of FIG. 7.

FIGS. 7 and 8 illustrate the construction of the color effects cartridge 30 which may be mounted on the output section 106 of the optical mixer and heat removal device 18. Color effects across the face of a light emitting panel are normally achieved by a placing or moving a color filter between the output aperture of a light source and the input aperture leading to the light emitting panel. Generally, in systems having a single light source for a single light emitting panel, color effects are achieved by mounting colored transparent filters upon a transparent disk and rotating it in front of the aperture of the light source. However, in systems of the subject type, where a plurality of connectors feed a plurality of light emitting panels illuminated by a single light source, a color wheel which is large, bulky and cumbersome would be required. Consequently, the color effects cartridge 30 provides a more effective and efficient alternative.

The color effects cartridge 30 includes an outer casing 126 having two outwardly projecting parallel legs 128 and 130. Extending between these parallel legs is a length of vertically oriented film 132 which is adapted to pass between the legs across the output window 114 when the color effects cartridge is in place on the output section 106. The distance between the legs 128 and 130 can be made substantially equal to the width of the output section so that the color effects cartridge can be easily slipped into place on the output section, or alternatively, the output section may be provided with suitable receiving means to receive and hold the color effects cartridge.

The section of film 132 which passes between the legs 128 and 130 constitutes a section of an endless film strip 134 contained within the outer casing 126. This endless film strip may, for example, be a continuous loop of 70 mm wide exposed and developed photographic film which is continuously driven by the cartridge drive motor 32. As will be noted from FIG. 8, pairs of vertically oriented idler rollers 136 and 138 which are mounted within the legs 128 and 130 cause the section 132 of the film strip 134 to be vertically oriented as it passes between the legs 128 and 130. Second pairs of horizontally oriented idler rollers 140 and 142 are mounted within the legs 128 and 130, respectively, above the roller pairs 136 and 138. The idler rollers 140 and 142 rotate about an axis which is substantially perpendicular to the axis of the idler rollers 136 and 138 and, thus, these horizontally oriented idler rollers operate to reorient the film strip 90° relative to the orientation of the section 132. This permits the film to be moved freely through the color effects cartridge by means of an upper horizontally oriented idler roller 144 and a drive roller 146 which is connected to be driven by the cartridge drive motor 32. The cartridge drive roller is provided with external teeth which cooperate in known manner with slots formed in the edges of the film loop to drive the film through the cartridge.

To permit reorientation of the film loop by the horizontally oriented idler rollers 140 and 142, the internal area of the legs 128 and 130 must be sufficient to permit looping of the film as indicated at 148 and 150 between the pairs of idler rollers 136, 138, 140 and 142.

A mechanism is provided between rollers 144 and 146 to "take-up" a long strip of color-effects film and store it in the interior of the cartridge using methods already employed by continuous strip movie or magnetic tape cartridges. This long strip of film in the cartridge allows for a continuously changing color pattern over a long period of time before it repeats itself.

The diffused light at the output window 22 of the optical mixer and heat removal device 18 is received at the input ends 28 of a plurality of rectangular connectors 26. These rectangular connectors are received in the female receptacle 24 which is mounted on the output section 106 for the optical mixer and heat removal device 18. This female receptacle includes a slot 152 (FIG. 9) which is positioned slightly outboard of the output window 22. When the color effects cartridge 30 is mounted over the female receptacle 24, the film section 132 extends into the slot 152 so that it will pass between the output window and the input ends of the rectangular connectors 26. When the color effects cartridge is not in use, a sealing strip 154 is snapped over the female receptacle 24 to close the slot 152 and prevent the escape of light therefrom.

The rear end of the female receptacle 24 is open to receive the rectangular connectors 26, and to position these connectors in side-by-side relationship across the extent of the output window 22. The inside surfaces of the female receptacle adjacent the open end may be provided with grooves, channels, or other suitable means to receive and hold the rectangular connectors in place in a position where the slot 152 will extend between the input ends 28 of the rectangular connectors and the output window 22. Ideally, the position of the connectors is alternated as they are inserted across the female receptacle 24, so that alternatively the flat optical cables 34 extending from the connectors will extend above and below the female receptacle as illustrated in FIG. 9. The rectangular connectors 26 are formed using many of the basic teachings for the formation of a male optical connector set forth in my U.S. Pat. No. 4,496,211 which are incorporated herein by reference. Thus, the input end of the connector includes a plurality of light conducting fibers 156 from the flat optical cable 34 which may be stripped of all cladding and fused into a single rectangular rod configuration to form a rectangular optical input aperture 158. The optical fibers which extend outwardly from the flat optical fiber cable 34 may be stripped of all cladding in an area directly adjacent the free ends thereof, and are coated with a binder, such as optical epoxy and then locked into a die of the correct cross-section to compress the fibers together at the end section thereof. Once the epoxy has hardened, the optical fiber bundle is removed from the die and prepared for encasement in the connector housing.

As illustrated in FIG. 10, the connector housing consists of two metal stampings 160 and 162 which are mirror images of each other. The two stampings come together at opposed flanges 164 and 166 and are dimensioned to enclose the tightly packed, fused optical fibers adjacent the input aperture 158 as well as the looser packed optical fibers extending between the fused fiber end and the heel portion 168 of the connector 26. Since the optical fibers are tightly packed and fused together at the input aperture 158, it will be noted that the cross-sectional area of the connector casing formed by the metal stampings 160 and 162 is the smallest at this point, as indicated by the reduced section 170. After this reduced section, the cross-sectional area of the metal stampings forming the casing expand in the mid-neck area indicated at 172 to accommodate looser packing of the non-fused, clad portions of the optical fibers 156, but it will be noted that the width of the metal stampings does not increase so that these stampings can be placed in close contact to one another within the female receptacle 24.

From the mid-neck section 172, the metal stampings 160 and 162 curve 90° to extend beneath the lowermost portion of the input aperture 158. Once the metal stampings extend below and behind the region of the input aperture, both the width and height thereof are increased to provide a flared-out heel section which accommodates the larger cross-sectional area of the flat optical fiber cable 34. However, this heel section of the casing formed by the metal stampings 160 and 162 is of less than twice the width of the metal stampings at the input aperture 158 so that the connectors can be alternated and placed close together in the manner illustrated i n FIG. 9 to form a substantially continuous input aperture across the width of the output window 22.

The metal sheath for the rectangular connector is formed and secured to the flat optical fiber cable 34 by securing the two metal stampings 160 and 162 together at the flanges 164 and 166. Also, flanges 174 and 176 which extend outwardly on either side of the heel section 168 may be attached to the optical fiber cable 34 by means of rivets or other connectors. With the metal casing so assembled, the face of the optical aperture 158 is polished to optical quality to complete the connector structure.

It is possible to form many variations of the rectangular connector 26 which are suited for various optical uses. For example, the rectangular input apertures 158 can extend horizontally rather than vertically as illustrated in FIG. 9 and can be stacked in rows. The connectors can be formed without the 90° curve so that cables can extend directly out the rear end of the connector. Non-curved connectors of this type can be arranged in many different stacking configurations across the output aperture 22.

The flat optical fiber cable 34 which is secured to the rectangular connector 26 incorporates a unique design which adapts the cable for a multitude of uses where conventional round cables would be either unsuitable or cumbersome. Previously, optical fiber cables were manufactured by threading the optical fiber bundle through a tubular unit which formed the outer jacket of the cable. This is not only a time consuming process, but also results in a cable design which is not readily adaptable to the conventional square or rectangular optical window structures through which light is often transmitted. Consequently, a need has arisen for a flat optical cable of rectangular design which is easy to manufacture and use.

With reference to FIG. 11, the flat optical fiber cable 34 consists of a two-piece plastic sheath 178 having two parts 180 and 182 which can be mirror image parts. The two part sheath is formed from two plastic extrusions which may be snapped together along the longitudinal edges thereof to define a central chamber 184 extending longitudinally the length of the sheath. The two extruded sections 180 and 182 snap together to form longitudinal flanges 186 and 188 extending in parallel relationship along opposite sides of the sheath. The sections are provided with cooperating snap structures 190 and 192 positioned between the central chamber and the flanges 186 and 188, respectively, to facilitate assembly of the sections 180 and 182 into the single sheath 178.

In the fabrication of the flat optical fiber cable 34, an optical fiber bundle 194 is laid in the central chamber 184 of one of the sections 180 or 182, and the two sections are then snapped together by means of the elongated snap structures 190 and 192. Permanent bonding may then be accomplished by glue, rivets or other means to secure the flanges 186 and 188 together and enhance the attachment provided by the snap structures 190 and 192. The flat optical fiber cable may be easily attached to support structures by nails or other fasteners driven through the flanges 186 and 188 and, if desired, the flanges can be provided with spaced apertures to receive suitable fastening means. Ideally, the flat optical fiber cable will have a thickness of less than ¾ inches which will allow the cable to be buried in relatively thin displays, billboards, signs and other structures where a thin cable unit is desirable.

Normally, an optical fiber bundle including conventional optical fibers 196 which incorporate an outer cladding material having a low index of refraction are wrapped in a thin plastic film which also has a low index of refraction. This film may include a reflective metal coating which, when it touches the optical fiber, can cause light loss along the points of contact which is undesirable. Consequently, the optical fiber bundle 194 incorporates a novel plastic cladding layer 198. This plastic cladding layer is formed from a wrapping film made by a special process to improve its performance as a secondary cladding to the optical fibers. Since the retention of light within the optical fibers increases as the index of refraction of the cladding material becomes lower, it is obvious that air or a vacuum would be the best secondary cladding for the optical fibers 196. However, this is not feasible within a cable structure that must bend and twist in compliance to external mounting requirements. Consequently, a unique cut foam plastic wrapping material is used in accordance with this invention as the plastic cladding layer 198, and the structure of this material reduces contact between the optical fibers and the plastic wrapping to a minimum.

The plastic cladding layer 198 is manufactured by first casting a large cylinder of flexible plastic foam wherein the plastic has a low index of refraction and is very transparent. The plastic foam cylinder is then turned on a lathe against a blade which cuts off a continuous thin sheet of foam. This cut foam material has a surface consisting of small plastic bubbles that have been sliced, leaving the cut walls of the bubbles jutting at various angles up to the surface. Optical fibers wrapped in this thin sheet of foam come into contact with only the edges of the cut plastic bubbles and, thus, only a very small percentage of the plastic wrap comes into direct physical contact with the optical fibers. Since contact between the optical fibers and the foam wrapping layer is a source of light loss, this specific cut foam wrap reduces contact and thus reduces light losses along the length of the optical fiber cable. Also, the cut foam wrap forming the plastic cladding 198 serves to cushion the optical fibers 196 from the inside walls of the cable sheath 178, thereby allowing the cable to be curved with a minimum of stretching and breakage of the optical fibers.

FIG. 12 shows a second embodiment 200 of the sheath for the flat optical fiber cable 34 wherein a single plastic extrusion is used. An upper portion of the extrusion 202 is hinged at 204 to a bottom section 206. The bottom section includes a plastic latch 208 which cooperates with a plastic lug 210 on the free end of the upper section to latch the upper section along its longitudinal edge to the lower section 206. This forms a central chamber 212 to receive the optical fiber bundle 194. The sheath 200 also includes longitudinally extending flanges 214 and 216.

As previously indicated, the use of the rectangular connectors 26 with the flat optical fiber cables 34 permits a plurality of connectors to be stacked across an optical window and to receive light from a single light source which will be transmitted through the attached flat optical fiber cable. One or more of the rectangular connectors with their associated flat optical fiber cables are connected to provide light to a light emitting fabric panel 36. Generally, one or two flat optical fiber cables can operate to direct light of sufficient intensity to evenly illuminate a 4' by 4' panel section, and a plurality of these sections can be combined to form a single large panel which is fed from a single light source by a plurality of rectangular connectors 26 and flat optical fiber cables 34.

A light emitting fabric panel 36 may be formed from multi-mode optical fibers consisting of fibers which have core diameters of at least several times the longest wave length of the light being passed through the fibers. The core of these fibers is formed of transparent material having a comparatively high index of refraction and which is coated by a thin coating of some comparatively low index of refraction transparent material or cladding. I have found that light may be emitted from areas along the length of a continuous strand of multi-mode optical filter that is guiding a light beam through its length by one of seven primary optical mechanisms. The first of these mechanisms is core scratching, wherein an optical fiber is scratched by cutting, by chemical etching, or by other means which remove cladding and core material at various sites on the fiber. Scratches which are deep enough to remove some core material will allow the escape of some transmitted light through the scratch and into the surroundings in proportion to the size and geometry of the scratch. In the absence of other light emission mechanisms, a scratch which removes cladding material but does not damage the core will not cause light to be emitted since the core-air interface traps the light even more efficiently than the core-cladding interface.

A second method for causing light emission along the length of an optical fiber is Mie scattering which is caused by the scattering of transmitted light by reflective or refractive particles within the core of an optical fiber. This method of light scattering is discussed in my U.S. Pat. No. 4,466,697.

Rayleigh scattering provides another method for emitting light along the length of an optical fiber. Variations in the index of refraction of the core material of an optical fiber on a molecular scale of less than 1 wavelength of transmitted light will cause isotrophic scattering of light rays passing through the optical fiber. Such Rayleigh scattering is random in direction and proportional to the uniformity of the transmitting material, and generally light scattered in this manner is too low in intensity to be useful in light transmitting panels.

It has been found that a light transmitting fiber having an inhomogeneous index of refraction will transmit light along its length. Systematic or random macroscopic changes in the index of refraction in the core of an optical fiber will cause random deflection in the trajectories of the light rays passing through a multi-mode optical fiber. An optical fiber core having an incomplete mixture of two different plastics with two different indexes of refraction would be an example of an inhomogenous index of refraction. Inhomogeneties could also be produced by diffusing chemicals into the core at selected sites along the fiber length, thereby resulting in a changed index of refraction. Stridations found in poor quality optical glass caused by uneven cooling of the glass also produces such inhomogeneties.

Any bending of an optical fiber results in additional curvature of the reflective walls of the optical fiber and therefore causes resultant modal spreading and light emission. It should be noted that modal spreading is caused by a change in the bending of an optical fiber and not by a constant curve in the fiber. Optical fibers woven into a fabric systemically change the curvature of individual optical fibers into a wave-like pattern which can be controlled to produce a fairly uniform light emission along a long length of optical fiber. Optical fibers can also be pressed into a mat which will cause non-uniform bending of the fibers. In an optical fiber mat, the emission distribution of any single fiber would be non-uniform and unpredictable, but the mat as a whole may be constructed to provide uniform light emission. Optical fibers can also be permanently bent into a wave-like pattern without being woven into a fabric. For example, a non-woven optical fiber ribbon can be bent into a wave-like pattern so that the length of the ribbon will emit light by modal spreading.

A geometric deformation along the length of an optical fiber will cause light transmission from the sides of the fiber. The core portion of an optical fiber resembles a very long cylinder in which the walls appear as reflective surfaces to the transmitted light. Any change in this basic cylindrical shape will cause modal spreading of the transmitted light rays allowing some light rays to exceed the angle of total internal reflectance and, thus, escape from the sides of the optical fiber. An optical fiber whose cross-section varies continuously in area and shape is an example of geometric deformation, and a conventional fiber can be geometrically deformed by being pressed between two uneven surfaces while in a plastic state. Also, optical fibers can be partially melted and allowed to cool again in a deformed shape.

Finally, an optical fiber can be caused to emit light along its length due to systematic geometric changes. The geometry of the core portion of the fiber may be systematically changed which can result in light emission by either modal spreading or by the direct emission of light by refraction or reflection. For example, notches may be formed in the core at regular intervals along the fiber, or small holes or pits may be formed in the fiber by a laser. Small beads of transparent material may be fused to the core at regular intervals, or similar systematic geometric changes to the core may be accomplished.

Many of the above-listed light emission mechanisms cause modal spreading of light being transmitted through a multi-mode optical fiber which eventually leads to the emission of light from the optical fiber. This process begins when some non-uniformity in the optical fiber causes some of the transmitted light to change its angle of divergence with respect to the longitudinal axis (Z-axis) of the optical fiber. Generally, the mechanism will cause some light rays to increase their angles of divergence while other light rays have their divergence angles decreased. Those light rays whose divergence angle is increased beyond the core-cladding critical angle, will penetrate into the cladding region of the optical fiber, but they will generally still be trapped within the optical fiber since emission from the cladding to the air beyond requires an even larger divergence angle. The cladding trapped light rays are continually traveling back and forth through the core region as well as within the cladding. In fact, the cladding trapped rays both reflect and refract from the core-cladding interface which causes delays in the penetration of cladding trapped rays in entering the cladding region. It will thus be seen that light emission caused by modal spreading is a two-step process where the light first escapes into the cladding and is then emitted into the surrounding air. Only rarely is a light ray given a single large deflection which carries it through both the core-cladding interface and the air-cladding interface in a single step.

When a mechanism that causes uniform modal spreading is present along a length of optical fiber, such as the bending mechanism caused by weaving, a delay in the light emission intensity is observed as measured from the onset of the modal spreading mechanism. The light emission will then be observed to gradually increase in intensity to some peak value, and this is followed by a sharp drop in light intensity. Mathematically, the light emission intensity can be described as a complex exponential function which varies as a function of the modal spreading.

The light emitting panels 36 of this invention all use woven optical fiber light emitting fabrics as the primary light emission mechanism. The light emitting fabric is then housed in a panel structure or encased in epoxy to form a rigid structure which provides support and a means of attaching the optical fiber cable 34.

As described earlier, there are a wide variety of light emission mechanisms that can be used to provide light emission from the optical fibers within the panel. A preferred method of light emission for this invention is the use of woven optical fiber fabric in which light emission is caused by modal spreading due to the bending of the optical fibers within the fabric. The other light emission mechanisms listed earlier are kept to a minimum so that the weaving effects dominate. Although the other light emission mechanisms can be used to produce a uniform light emission under controlled conditions, the weaving of fabric is already a known art for which mechanisms exist that can easily be programmed and adjusted to produce any desired weave pattern effect. Looms may be successfully used to weave optical fibers into complex weave patterns.

Experimentation has shown that the preferred method of weaving the light emitting fabric is to use a high density unbalanced weave pattern. In a balanced weave pattern, the number of warp threads per inch nearly equals the number of weft threads per inch. The exact requirement for a weave to be balanced is a function of the thread diameters, the thread stiffness, the packing density, and several other variables. The result is that a balanced weave will hold together in use while an unbalanced weave will quickly become unraveled in use if it is not firmly bound along its edges.

A light emitting fabric provides the greatest illumination when there are more optical fibers per linear inch. For a single layer light emitting fabric, the highest density is achieved when the optical fibers are lying side by side touching one another in the fabric so that the number of fibers per linear inch, N, equals the inverse of the optical fiber diameter, d, expressed in inches; i.e., $N=1/d$. It is not possible to meet this condition in a balanced weave fabric since there must always be room between successive threads to allow the cross-threads to pass over and under. Balanced weaves can be used in fabricating light emitting fabrics, but they will have a lower light output per unit area.

For the specialized light emitting panels of the present invention, in which the light enters the fabric along two opposite edges of the fabric, and in which the fill threads are conventional multi-strand threads, the weave ratio R is obtained by the following formula:

$$R = n^2(d_1+d_2)Lb/(a+1) = 27 + or - 25 \qquad \text{Eq. 1}$$

Where:
- $n$ = The number of fill threads per linear inch of the light emitting fabric in the direction of the optical fibers in a simple one layer weave. In a complex weave, n is twice the number of weave cycles per inch undergone by the optical fibers. If a variable spacing between fill threads is used, then a weighted average value of n may be used.
- $d_1$ = The diameter of the optical fibers used in the weave for a simple one layer weave pattern.
- $d_2$ = The diameter, or effective diameter, of the fill threads used in the weave for a simple one layer weave pattern. Multi-strand conventional thread or string is used as the light emitting fabric fill threads. However, conventional fill threads become compressed when woven into a light emitting fabric so that their measured diameter before being woven and their "effective" diameter after weaving is different. For the purpose of this calculation, the effective diameter of multi-strand fill threads shall be considered to be equal to the total measured thickness of the light emitting fabric minus twice the thickness of the optical fibers. In some cases, this may result in the effective thickness, $d_2$, having a negative value if the fill threads become highly deformed.
- $L$ = The total length of the fabric in which optical fibers are part of the weave as measured in the direction of the optical fibers. In a complex fabric in which the fill threads have variable spacings between them, the value of L may be adjusted to account for the non-linearity of the weave.
- $a$ = The number of times the light emitting fabric is folded, with an "angled" fold, with the fold being perpendicular to the direction of the optical fibers in the weave. This parameter is only meaningful if it has an even value such as 0, 2, or 4 folds; otherwise, the two bright edges of the fabric would be on top of one another along the same edge of the folded fabric which would increase the non-uniformity of the fabric. If a light emitting panel is made from a sheet of light emitting fabric that has been folded to increase the intensity and uniformity of the light output, then the length, L, of the fabric before folding must be divided by the number of folds plus one. This factor is expressed by the parameter "a" in Equation 1 above. In a folded fabric, the ideal value of R remains near 27 but the interpretation of high and low values of R are complicated and require some interpretation depending on exactly how the folding was performed. In any case, an "angular" fold is assumed whereby the fibers are not strongly bent or kinked in the fold. If the fold does involve kinking of the optical fibers a great deal of the transmitted light will be emitted at the fold and the value of R loses its meaning, or has to be modified for the particular application. It is also possible to fold a fabric parallel to the optical fibers in which case the constant a still refers to the number of folds.
- $b$ = This constant has the value one in light emitting fabrics where the light enters along two opposite edges of the fabric and has the value two in light emitting fabrics where the light enters only along one edge of the fabric and is reflected from the opposite edge by mirror-like reflectors, loop-back weaves in the fabric, or the like. In fabrics where the light enters along one edge and is emitted, absorbed, or otherwise lost along the opposite edge of the fabric the value of this constant is one. In cases where the light enters along one edge of the fabric and is partially reflected back into the optical fibers along the opposite edge, this constant is given the value somewhere between one and two in proportion to fibers at the far edge. In fabrics where the optical fibers are bent in a relatively wide loop along one edge and woven back into the fabric so that all the optical fibers emerge along one edge of the fabric, the length L must be replaced by an effective length of two times the measured length of the woven optical fibers. This is expressed by the parameter "b" in Equation 1 above. Likewise, if the fibers are cut along the far edge and given a mirror coating to reflect the light back into the optical fibers of the fabric, then the effective length of the fabric is twice the measured length. Use of loop-backs or optical fiber end reflectors to reverse the light flow along one edge of the fabric may be made to reduce the length of optical fibers required to fabricate a light emitting fabric.

Measured weave ratios for a number of experimental light emitting fabric samples have illustrated that the "optimum" weave ratio is one that produces a light emitting fabric that appears uniform to the eye when illuminated and which is also highly efficient. For light emitting fabrics which use conventional multi-strand thread or string as their fill fiber, the optimum weave ratio is about 27 dimensionless units. (A dimensionless unit is a dimensionless constant; an example of a dimensionless unit being the index of refraction of glass.) For light emitting fabrics using solid plastic (or the like) monofilament as the fill fiber, the optimum weave ratio is about 17 dimensionless units. All samples having weave ratios of as little as 10 units above the optimum value, were found to have a dark band running through the center portion of the fabric.

Any panel having weave ratios less than the optimum value will appear uniform to the eye. The smaller the weave ratio is, the more uniform the light emitting fabric will appear to the eye. However, except for folded fabrics, the smaller the weave ratio, the lower the efficiency. In a light emitting fabric, efficiency is a measure of the amount of light emitted by the fabric divided by the amount of light sent into the fabric. As the weave ratio decreases, a greater proportion of the light entering one edge of the fabric will exit through the optical fibers at the opposite edge without having been emitted. Thus, the fabric becomes less efficient. However, uniformity usually increases as the weave ratio decreases, and thus the proper choice of the weave parameters, and hence the weave ratio, becomes a trade-off between efficiency and uniformity.

The light emission is non-uniform down the length of a light emitting fabric which results in a broad range of acceptable weave ratios. The "optimum" weave ratio stated above is actually the high end of the acceptable range. The weave ratios at the low end of the acceptable range are about half the optimum values: about 13.5 for multi-filament fill thread fabrics and about 8.5 for mono-filament fill thread fabrics. The efficiency drops only a small fraction of its value (for example, 25%) as the weave ratio drops to half its value across this range. However, as the weave ratio drops below the low end of the acceptable range, the drop in efficiency becomes approximately linear in direct proportion to the drop in weave ratio; i.e., if the weave ratio drops to half of its low acceptable value, then the efficiency will likewise fall to approximately half of its former value.

It has been previously stated that a woven optical fiber emits light along its length as a result of modal spreading caused by the bending of the optical fiber. However, a second mechanism, called contact emission, causes a high percentage of the observed light emission in all light emitting fabrics. It has been experimentally observed on numerous occasions that optical fibers emit light whenever they are pressed against another solid surface, regardless of the nature of that surface. The important observation here is that the optical fiber must be pressed against the foreign surface; it will not leak light at the point of contact if the optical fiber is merely touching the foreign surface.

In all weave patterns that I have examined, the optical fibers are pressed against the non-optical fiber threads with sufficient pressure to cause considerable leakage of light at the point of contact. Often this contact emission is greater in intensity than the emission caused by the modal spreading resulting from the bending of the optical fibers. The cause of contact emission is not known at this time. It may be caused because the cladding on plastic optical fibers is soft and easily deformed by an object pressing against it with a mild force. This would allow the foreign object to push aside the cladding and come into direct contact with the core portion of the optical fiber. Light striking the foreign object would be reflected or refracted according to the nature of the material, and thus emitted into the surroundings.

Contact emission causes light emitting fabrics woven with mono-filament fill threads to have different light emission characteristics than those woven with multi-strand fibers. This is the reason two different types of weave ratios are required depending on the type of fill threads used in the fabric. Mono-filament threads exert a relatively high pressure on the optical fiber at a single point of contact at each position where they meet in the weave. Multi-filament conventional threads, on the other hand, are themselves easily deformed and contact the optical fibers over an extended path at each position where the optical fibers and fill threads cross one another. Furthermore, conventional threads are composed of many strands of fibers which individually contact the optical fiber over the extended contact area. These many small strands each apply a relatively small pressure to the cladding material causing less light to be emitted across the contact point as compared to mono-filament contact points.

This difference in fill thread composition causes the conventional multi-strand fill thread light emitting fabrics to have nearly twice the weave ratios of mono-filament fill thread fabrics. Furthermore, light emitting fabrics woven using conventional fill threads have a more uniform light output when all other parameters are equal. For this reason conventional fill threads are used in the preferred embodiment of this invention, although mono-filament fill threads can be adjusted to emit acceptably uniform light.

Figure 14:
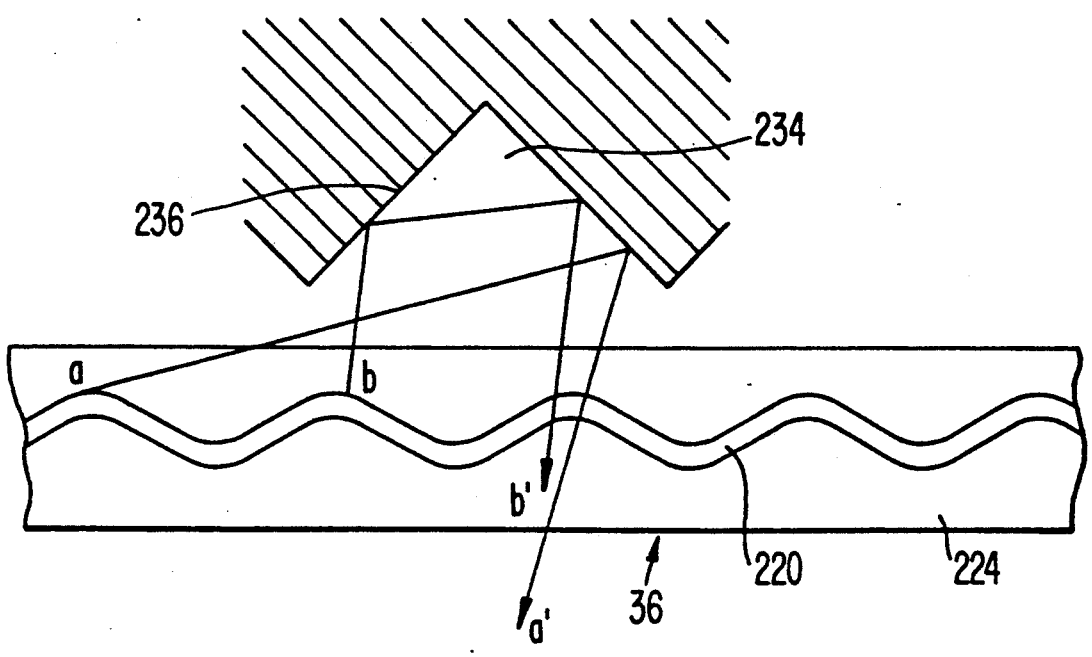
FIG. 14 is a diagrammatic illustration showing the light path from the light emitting fabric panel of FIG. 13.

Each light emitting panel 36 is formed from at least one sheet of light emitting fabric 218 consisting of light emitting fibers 220 which are woven about fill threads 222. The light emitting fabric is embedded in a slab of transparent material, such as epoxy 224, as illustrated in FIG. 14, so that the fabric is not exposed to the air except at the point where the light emitting fibers emerge from the epoxy slab and extend to the flat optical fiber cable 34. These optical fibers emerge from the epoxy slab as indicated at 226 and are immediately bent up over the rounded edge 228 of a plastic foam core 230. The foam core serves to protect the optical fibers from scratching, and the rounded edge prevents excessive bending of the fibers which would result in light losses. The foam core is molded to direct the passage of the optical fibers toward the back of the panel where the fibers are combined into the flat optical fiber cable 34.

Optical fibers leak a large percentage of the light travelling through them when they are sharply bent due to the fact that an optical fiber permits light to escape through the fiber cladding layers when the relative angle between the light beam and the cladding layer is greater than a specific critical angle. Thus, a fiber which is bent around the sharp edge of a frame, panel, or the lip of a small hole will leak a large percentage of light in the region of the bend. Unless this is a desired design effect, care must be taken to round off such sharp edges so as to keep the resulting light losses within acceptable limits. A radius of curvature of one-eighth inch is generally acceptable for the DuPont 0.01 inch in diameter Crofon ® plastic optical fibers. All edges on the panels of this invention can be given curvatures of this amount without interfering with the utility, function, or aesthetics of the resultant products.

In the past, it has been assumed that a laminated light emitting panel can be constructed by coating the surface of a woven light emitting fabric covered panel with a transparent medium such as plastic, epoxy, glass or the like. In such a laminated light emitting panel, the transparent coating medium encapsulates the light emitting optical fibers, and any deformities provided therein to cause light emission. It has also been assumed that the light rays traveling through the core region of the optical fibers will encounter a deformity in the cladding and/or core of the optical fiber which will cause some of the light to be directed into the encapsulating medium. This escaped light will either eventually strike the bottom surface which will reflect the light upwards to the top surface, or it will directly strike the top surface. It has been theorized that some of the light striking the top surface will then be refracted into the air above the panel.

The aforesaid concepts have been found to be erroneous, for in fact, only very small amounts of light can be emitted by panels having this construction, and this low intensity light is generally caused by multiple reflections at optical boundries which have not previously been recognized. In order to emit light from any type of optical fiber light emitting panel having a laminating medium encapsulating the optical fibers, some sort of light scattering mechanism must be provided. Without a light scattering mechanism, light rays emerging from a deformity in the optical fiber will emerge in the forward direction from said deformity at a small angle with respect to the longitudinal axis of the optical fiber. When the small angle light rays strike the top surface of the encapsulating medium, they will generally be within the critical angle requirements for total internal reflection, and thus, most of the light rays will be prevented from escaping from the encapsulating medium. Light rays thus trapped in the encapsulating medium will generally be quickly attenuated by the relatively high light absorbtivity of the medium.

In the past, it has been theorized that an effective laminated light emitting panel can be constructed with optical fibers encapsulated in a transparent medium or layer if the encapsulating medium has an index of refraction that is equal to or less than that of the optical fiber core material. However, when the encapsulating medium has a relatively low index of refraction, it serves the same function as a cladding, that is it serves to trap the light within the optical fiber core material by the mechanism of total internal reflection. If the encapsulating medium has the same index of refraction as the optical fiber core material, then light may escape from regions of the optical fiber where the cladding has been removed, but the light will have low escape angles which will keep it trapped within the encapsulating medium as stated above. Some sort of light scattering means is essential to the emission of light from optical fibers of known type which have been treated so as to emit light along their lengths when such fibers are in optical contact with an encapsulating medium. Until now, it has not been recognized that an additional light scattering means is necessary to effectively overcome the light trapping effects of the encapsulating medium.

In FIG. 14, a reflector sheet 232 is positioned between the foam core 230 and the epoxy slab 224, and this reflector sheet is formed with a plurality of parallel grooves 234 positioned to face the light emitting fabric 218. Each of these parallel grooves extends from a central apex to form a 90° angle, and the internal surface 236 of each groove is either polished or coated with reflective material so as to provide a reflective surface. The grooves thus each form a corner reflector and are positioned to extend parallel to the fill fibers 222.

In a woven light emitting fabric 218, approximately five times more light is emitted at angles nearly parallel to the surface of the weave than is emitted at angles perpendicular to the woven surface. The corner reflecting grooved reflector 232 is designed to compensate for this property of the light emitting fabric as is illustrated in FIG. 14. Light emitted by the fabric at angles nearly parallel to the fabric surface and toward the grooved reflector, as illustrated by light ray a—a', will only strike a mirror surface 236 once and then will be redirected toward the front surface of the panel 36. This single reflection is seen to redirect nearly parallel light so that it becomes nearly perpendicular light that is then emitted through the epoxy slab and the front of the panel. On the other hand, light that is emitted at nearly perpendicular angles toward the grooved reflector generally strikes the reflective surfaces twice, as illustrated by the ray b—b', and results in the light being directed toward the front of the panel in a direction that is still nearly perpendicular to the surface of the fabric 218. Thus, the reflector sheet 232 causes most of the light emitted by the light emitting fabric 218 to be directed in a direction substantially perpendicular to the panel.

Figure 13:
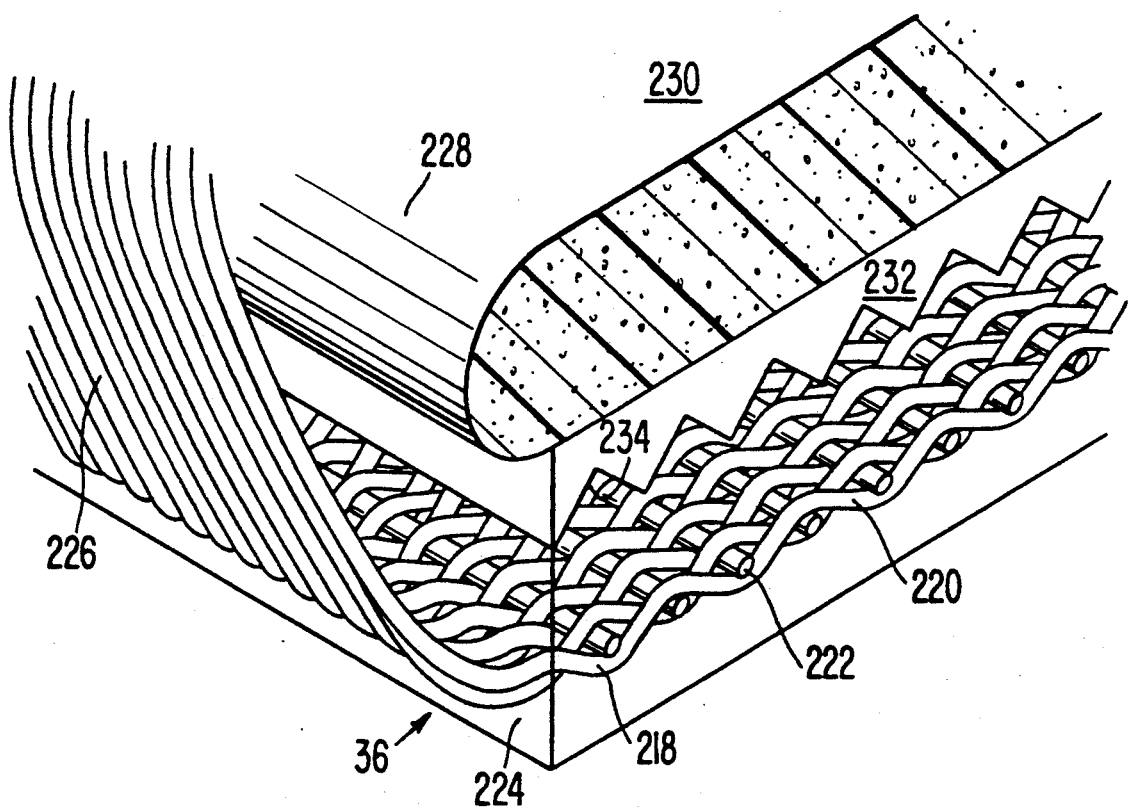
FIG. 13 is an exploded view of a section of a light emitting fabric panel of the present invention.

The reflector sheet 232 in FIG. 13 is secured to the foam core 230, and is prevented from contacting the light emitting fabric 218 by the epoxy slab 224 (to avoid contact emissions discussed earlier). However, the reflector could be formed as an integral molded portion of the foam core and then coated with a reflective material to form the internal reflective surface 236. The light emitting fabric is completely encapsulated by, and floats in, the epoxy slab 224 so that it cannot touch the reflector or other object.

The light emitting panel 36 can take a number of alternate forms, although a preferred form is illustrated in FIG. 13. For example, the epoxy slab 224 can be eliminated and the light emitting fabric 218 might be supported directly on the foam core 230. The reflector 232 between the foam core and the light emitting fabric can take different forms such as a white fabric layer or a painted white reflective layer. Also, the light emitting fabric 218 can be housed within a box-like housing structure having at least one transparent panel or surface extending parallel to the light emitting fabric, and the edges of the light emitting panels 36 may be provided with tongue and groove configurations, snaps, or other means to enable the panels to be connected together to form a single large light emitting panel.

Experimentation with light emitting panels of the type illustrated in FIG. 13 indicates that often light emission from the first 5–10% of a light emitting fabric, as measured from the edge where the optical fibers enter the panel, is usually less when compared to light emission from the remainder of the fabric. This is due to the modal spreading pumping action wherein light from modal spreading first leaks into the cladding and is then emitted into the external environment. This effect often causes the first inch or two of a light emitting fiber panel to be noticeably darker than the rest of the panel. However, this effect can be counteracted by fabricating pre-emitters adjacent the edge where the optical fibers first enter the light emitting fabric. A pre-emitter is any structural modification in the light emitting fabric which will increase the light emission at the first portion of the fabric where the fibers enter.

Figure 15:
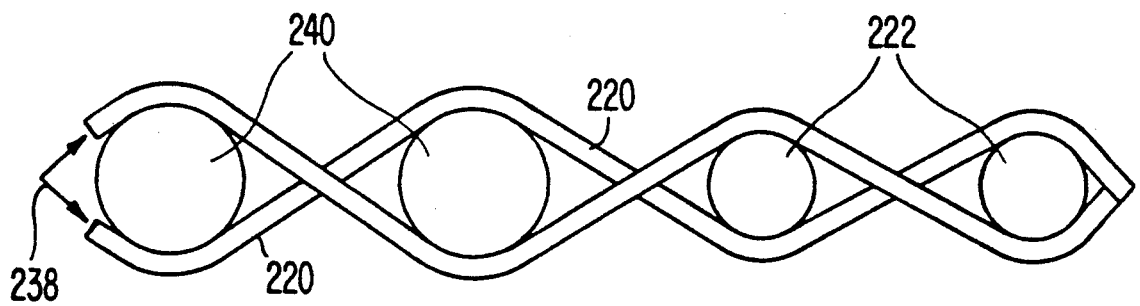
FIG. 15 is a diagrammatic view showing the formation of a pre-emitter in the woven light emitting fabric of the present invention.

An effective method for forming a pre-emitter at the input end 238 of a light emitting fabric is to increase the fill thread diameter of the first few fill threads as indicated at 240 in FIG. 15. This increases the curvature of the light emitting fibers 220 which are woven over these enlarged fill threads, thereby increasing light emitted in this area.

Figure 16:
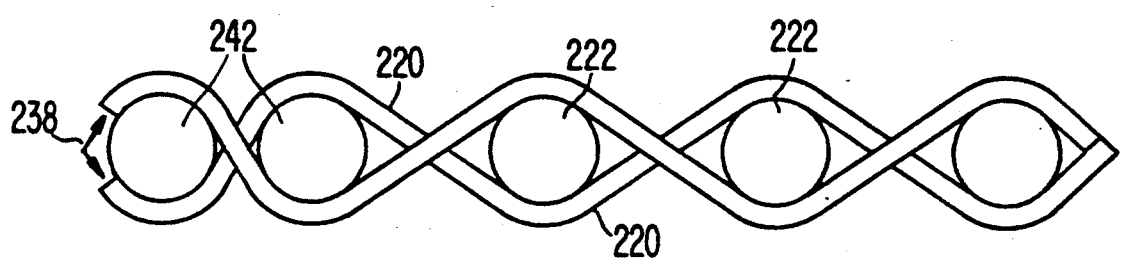
FIG. 16 is a diagrammatic view showing the formation of a second embodiment of a pre-emitter in the woven light emitting fabric of the present invention.

Another method for forming a pre-emitter at the input end 238 of a light emitting fabric is to position the first few fill threads 242 closer together than the remaining fill threads in the fabric, as illustrated in FIG. 16. This again increases the curvature and therefore the light output of the light emitting fibers 220 which pass over the fill threads 242.

Figure 17:
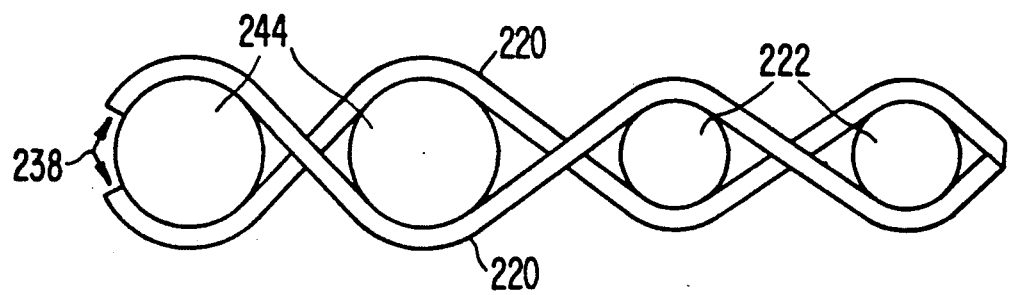
FIG. 17 is a diagrammatic view showing the formation of a third embodiment of a pre-emitter in the woven light emitting fabric of the present invention.

Of course, as illustrated in FIG. 17, a combination of the two previous methods may be employed to form a pre-emitter. In this combination, the diameter of the first fill threads 244 is increased, and also these first fill threads are spaced closer together than the remaining fill threads 222. Obviously, the fill threads used to form these pre-emitter mechanisms should be of the conventional multi-filament (multi-mode) type for best results, as mono-filaments will cause greater undesirable contact emission.

All types of complex weave patterns can be used to fabricate a light emitting fabric 218 in accordance with the present invention. The application of the weave ratio to multi-layer fabrics, fabrics with patterns, fabrics with balanced weave patterns, fabrics in which some of the warp threads are not optical fibers, fabrics in which the optical fibers form the fill threads on the loom and other variations, can be made in accordance with the rules of usage stated earlier, or by logical adaptations of those rules. It is quite feasible to vary the weave structure of a light emitting fabric to control light emission. Two simple forms for accomplishing this are illustrated in FIGS. 18 and 19. As previously indicated, light emission decreases as light passes along the length of the optical fibers 220 used in the light emitting fabric 218. This may be countered to some extent by progressively spacing the fill threads 222 closer together as the fabric moves away from the input end 238, as illustrated in FIG. 18, so that the widest spaced fill threads are adjacent the input end. Similarly, the diameter of the fill threads could progressively increase as the fabric extends away from the input end 238 as illustrated in FIG. 19. Both of these weave variations would progressively cause the light emitting fiber 220 to emit additional light as it moves away from the input end 238, therefore compensating for the normal decrease in light emissibility as the fiber moves away from the input end.

When a light emitting fabric panel 36 of the type described is combined with a flat optical fiber cable 34 and a rectangular connector 26, it is desirable to arrange the optical fibers 156 at the input aperture 158 of the connector 26 to be at least semi-coherent with the light emitting fabric panel. Thus fibers which emerge from the upper left side of the panel either continue through the cable 34 and the connector 26 to ends arranged at the upper left side of the input aperture 158, or connect to fibers in the cable and connector which are so arranged. The same is true for fibers emerging from other quadrants of the panel which are arranged to correspond with fiber ends in like quadrants of the connector input aperture. By thus rendering the connector semi-coherent with the panel, color effects are transmitted in a uniform fashion to the panel where they are displayed.

To this point, the discussion has concerned a woven light emitting fabric wherein an optical fiber emits light into the surroundings as a result of modal spreading caused by the bending of the optical fibers. However, as previously discussed, contact emission causes a high percentage of the observed light emission in all light emitting fabrics.

The contact emission phenomenon can be employed to form a light emitting panel 240 from a nonwoven optical fabric 242. As illustrated in FIG. 20, layers of nonwoven optical fibers 244 separated by fill threads, such as mono-filament fibers 246, form the nonwoven light emitting fabric 242. These fiber layers may be somewhat randomly arranged, although the input ends of the optical fibers should exit the fabric at the input end 38. The light emitting fabric 242 is pressed between a backing layer 248 and a transparent front panel 250. This causes the optical fibers to deform at points of contact 252 with the fill threads 246 and to emit light from these contact points. The backing layer 248 may be provided with a reflective layer 254 to reflect the light through the transparent front panel 250.

As illustrated in FIG. 21, it is possible to vary the light emitted from the non-woven fabric 242 by increasing the pressure applied to some areas of the fabric. For example, the backing panel 248 might incline away from the input end 238 to increase the contact pressure at the contact points 252 between the light emitting fibers 244 and the fill threads.

FIG. 22 illustrates a modified light emitting panel 256 wherein a plurality of unwoven light emitting fibers 244 are supported between the transparent panel 250 and the backing panel 248. The fill threads of the previous embodiments are eliminated and, instead, hard ridges 258 are formed to extend outwardly from the reflective surface 254 of the backing panel 248. These hard ridges form the contact points 252 with the light emitting fibers 244 to cause contact emission therefrom. As shown in FIG. 22, the ridges 258 may extend outwardly from the panel 248 progressively for a greater distance as the panel extends away from the input end 238. This will cause increased light emission along the lengths of the fibers 244. Obviously, similar increased light emission along the lengths of the optical fibers 244 could be achieved in the panel 240 of FIG. 20 by increasing the diameter of the fill threads 246 progressively as the fiber extends away from the input end 238.

The panel using the ridges 258 can also cause nonwoven light conducting fibers to emit light by modal spreading if the ridges are used to cause curvature of the fibers. To accomplish this, the transparent panel 250 might be formed with depressions corresponding to the curvature of the ridges 258 to receive curved fibers.

FIGS. 23–26 disclose light emitting laminated panels 272 formed in accordance with the present invention wherein additional light scattering configurations are provided to overcome the light trapping effects of a light fiber encapsulating medium. In each of these panels, the optical fibers may be woven fibers or nonwoven light emitting grids. In each panel, the fibers 270 are encapsulated within a transparent medium or layer 274 formed of a material that has an index of refraction that is equal to or greater than the index of refraction of the core 276 of the optical fibers. The panel also includes a reflective layer 278 and a support layer 280. Variations in this arrangement could be used wherein the reflective and support layers are eliminated and the encapsulating medium serves as the sole support for the fibers so that light is emitted from both the front and back surfaces of the panel 272.

In the panels of FIGS. 23–26, the cladding 282 and in some instances, the core 276 of the fibers 270 is deformed along the fiber length as indicated at 284 to provide light emitting deformities. However, this is for purposes of illustration only, and the light emitting deformity can be formed by other means previously described such as a bend in a woven fiber. When the encapsulating medium 274 has an index of refraction which is equal to or greater than the index of refraction of the fiber core 276, most of the light striking the area of deformity 284 will escape into the encapsulating medium. The greater the index of refraction of the encapsulating medium above that of the core material, the greater will be the average angle of the escaping light. However, unless the light is further scattered, it remains trapped within the encapsulating medium by total internal reflection, and increasing the index of refraction of the encapsulating medium will not solve this problem since the critical angle thereof changes so as to continue trapping the light.

Figure 23:
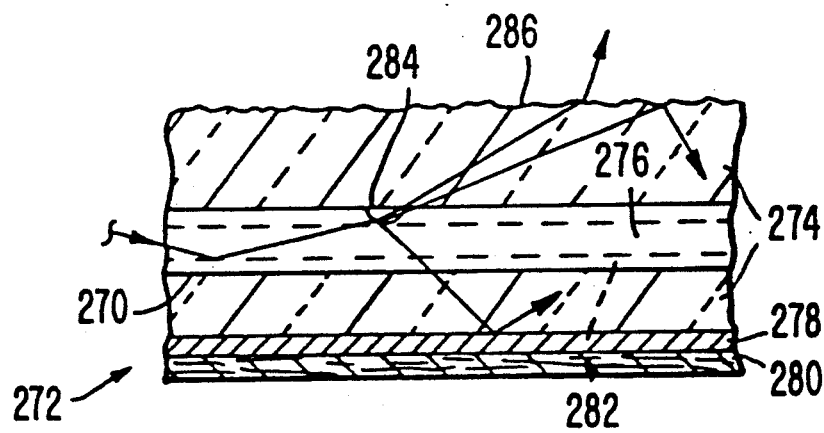
FIG. 23 is a sectional cross-sectional view of a laminated light emitting panel of the present invention.

FIG. 23 illustrates a novel method of providing a light scattering means at the top surface of the encapsulating medium. Here, the top surface 286 of the encapsulating medium 274 may be sandblasted or optical irregularities may be molded into the top surface (such as small prism or pyramid shapes). Alternatively, the top surface may be coated with a light scattering substance, or a light scattering substance may be glued onto the top surface (provided the glue itself has an index or refraction higher than the encapsulating medium). Although this method of forming a light scattering layer at the top or outermost surfaces of the encapsulating layer 274 will scatter some light into the region above the panel 272, more than half of the light impinging on this surface will scatter downwardly toward the reflective layer 278. Also, generally half of the light emitted by the deformity 284 will be initially directed in a downward direction towards the reflective layer. Thus the light emitted by the optical fibers generally undergoes multiple internal reflections before being emitted from the panel, thereby causing relatively high optical absorption losses to be suffered by the panel of FIG. 23.

Figure 24:
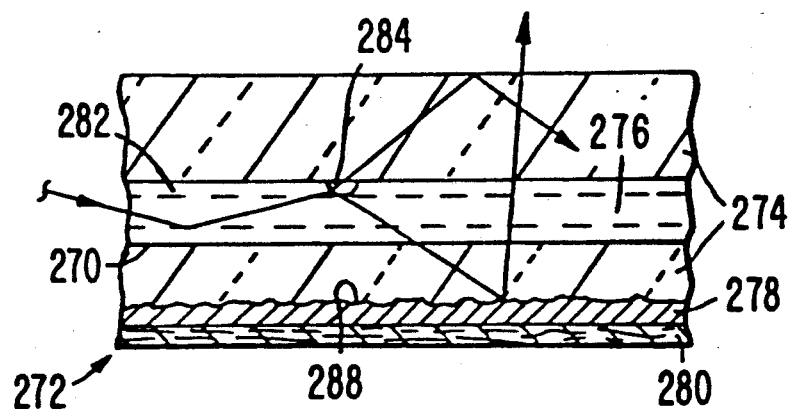
FIG. 24 is a sectional cross-sectional view of a second embodiment of a laminated light emitting panel of the present invention.

FIG. 24 shows an alternative method of providing a light scattering means for the panel 272 where the reflective surface 278 is given a texture so as to scatter light impinging on said surface from within the encapsulating medium. The reflective surface 278 is provided with a raised texture 288 which may be regular, geometric, irregular or random. The reflectivity of this surface may be caused by a coating of silver paint, chemically deposited metal, a layer of relatively low index of reflection material, or a combination thereof. Alternatively, a coating of opaque white paint, epoxy, or the like could provide a simple and effective light scattering layer. The efficiency of the reflective light scattering surface 288 of FIG. 24 is generally comparable to that of FIG. 23.

Figure 25:
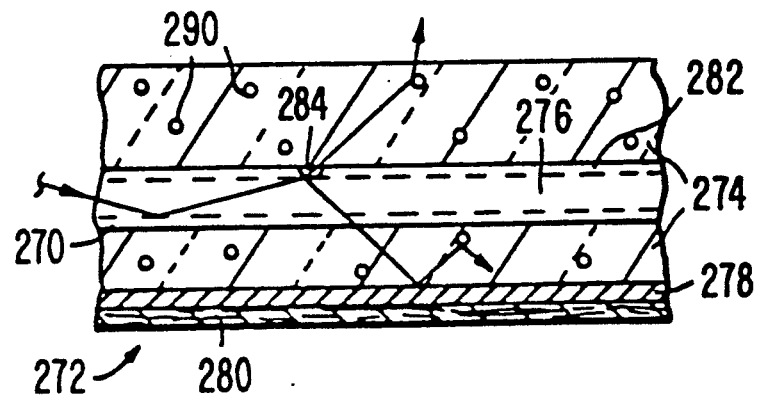
FIG. 25 is a sectional cross-sectional view of a third embodiment of a laminated light emitting panel of the present invention.

In the panel embodiment of FIG. 25, numerous light scattering particles 290 are added to the encapsulating medium 274. These scattering particles could be white or silver pigment particles, air bubbles, crystals, white or silver threads, particles or filaments of glass, quartz, plastic or the like, crystal fracture lines in the encapsulating medium; or similar reflective light scattering means. In this case, the encapsulating medium could be a translucent as well as a transparent medium which scatters the light from very fine pigment particles, and the light scattering units may be confined to the top portion of the encapsulating medium in order to increase the uniformity of the light emission from the panel as a whole. A wide variation of special effects can be achieved by this method of light scattering, and efficiency may vary from very poor (if the particles are widely spaced or if the particles are opaque and shadow portions of the light output) to a modest efficiency. This method of light scattering would generally increase the number of reflections and/or refractions the light must undergo in order to be emitted from the panel, and thus the optical absorption becomes higher. Some specialized scattering particle means could be used that produce high light output, such as precisely aligned small cone mirrors, prism mirrors, or the like. Greater light output from an optical fiber light emitting panel may in some cases be achieved by combining two or all three of the methods shown in FIGS. 23 through 25.

Figure 26:
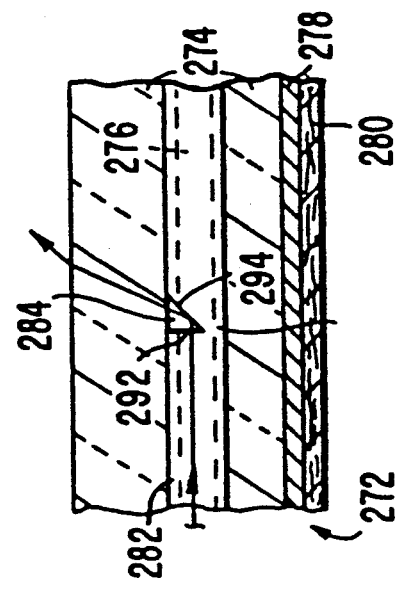
FIG. 26 is a sectional cross-sectional view of a fourth embodiment of a laminated light emitting panel of the present invention.

FIG. 26 shows that specialized notches 284 may be cut into an optical fiber such that light is scattered out of the optical fiber at angles that approach the perpendicular relative to the longitudinal axis of the optical fiber. This novel notch design has a first wall 292 which is substantially perpendicular to the longitudinal axis of the optical fiber and a second wall 294 which is at approximately 45° to said axis. The perpendicular or first wall of the notch must be positioned closest to the light source so that light within the optical fiber will strike the first wall of the notch perpendicularly and will, for the most part, pass through said first wall with little back scatter and with little change in direction. It can now be seen that the high index of refraction material in the notch forms a small 45° prism. If the relative index of refraction of the encapsulating medium 274 is high enough, the light will be reflected off of the second wall of the notch by the process of total internal reflection (as for example occurs in a 45° prism used in a tank periscope) and is thereby bent upwards towards the top surface of the panel. Since the light is striking this top surface of the encapsulating medium at an angle approaching the perpendicular, the light will pass through the top surface without being trapped within the encapsulating medium by total internal reflection. If the notches 284 of this novel design are all arranged to directly face the top surface of the panel, and if a high degree of precision is maintained in forming these notches, a very high degree of light output efficiency can be achieved with most of the light being emitted perpendicular to the panel surface.

In variations of this novel notch concept, the notch may have a rounded or flat bottom portion between the first and second wall elements 292 and 294. The notch will still emit useful quantities of light if the encapsulating medium 274 has an index of refraction only slightly greater than that of the core material 276. These notches may be positioned on all sides of the optical fibers so that light from some notches first strikes the reflective layer 278 where it is then reflected towards the top surface. Half, or some other useful portion of the notches may have the position of their first and second walls reversed so as to emit light travelling in either direction out of the fiber. Also, a "W" shaped notch may be designed using these same principles to emit light traveling in either direction. This same notch design has proven to work very efficiently when the encapsulating medium is air. When used in air, the second wall 294 should make an angle of 45° or less with the longitudinal axis of the optical fiber for best results. This notching method is therefore very useful as a general optical fiber light emission method for light emitting fabrics, light emitting optical fiber grids or any application using light emitting optical fibers.

All of the laminated panels 272 using optical fibers shown in FIGS. 23 through 26 may be formed using optical fibers which have no cladding. In this case, the encapsulating medium 274 must have an index of refraction which is less than that of the core material 276 for the claddingless optical fibers 270. The deformities 284 must now be of a type which notch, cut, bend, weave or otherwise deform the local geometry of the core material 276. Since the encapsulating medium must now have a low index of refraction, the special notch design of FIG. 26 offers no particular advantage over the other methods shown.

The methods of fabricating laminated optical fiber panels shown in FIGS. 23 through 26 can be extended in many useful ways. Foreign objects or substances may be added into the encapsulating medium 274 that serve useful functions other than those of light scattering; such as aesthetically pleasing shapes and/or objects; brackets, wires, threaded rods, and other attachment means; glass fiber mesh, wire screen or other strengthening means; electric wires, electric heating filaments, pipes, tubes, and the like. The panels 272 may contain more than one layer of light emitting optical fibers 270, and may be made thick to allow room for the optical fibers to be arranged in a three dimensional pattern. For example, the optical fibers may be strung in an up-down wave pattern across the width of the panel. Also, the panels may be given protective coatings, special optical coatings (such as anti-reflective coatings), special textured coatings, or other coatings for aesthetic purposes, or the encapsulating medium may be dyed or otherwise colored so as to color the light emerging from the panel.

Patterns or lettering or the like may be printed on the top surface of the panel or overlays consisting of transparent or translucent sheets of paper, film, plastic, or the like may be glued or otherwise affixed to the surface of a laminated light emitting panel. In such applications, the panel provides back-lighting and support for said overlays which may be printed upon or otherwise have colored or black and white patterns, pictures, lettering, or the like applied thereon. By using a glue or other attachment means that is easy to remove without damage to the light emitting panel, an overlay may be changed as often as desired or is useful. This overlay and panel combination is of particular usefulness in the fabrication of signs, billboards, advertising display panels, decorative wall panels, instrument panels, and the like. Normally, illuminated signs and instrument panels must be back lighted using large box-like housings containing suitable light bulbs or they are illuminated by beaming high intensity lights on the sign using extensive light fixture hardware. Film or paper overlays on light emitting laminated panels, on the other hand, may be very thin and thus require a minimal support structure. The light source means may be contained in a suitable housing located in a utility area, on the ground, or in another easy to access location for convenient maintenance. Since the light source may be connected to the sign, billboard, or the like by an optical fiber lightpipe cable, great simplicity, convenience, and economy is achieved.

Figure 27:
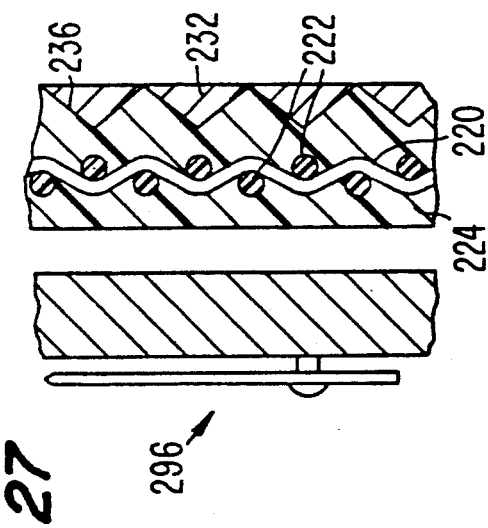
FIG. 27 is a sectional cross-sectional view of an instrument back lighting assembly of the present invention.

For the back lighting of instrument panels, light emitting panels constructed in accordance with this invention may be configured to fit into very small areas behind the indicators 296 for the instrument as indicated in FIG. 27.

A special and novel arrangement of the optical fibers on the back side of any light emitting panel can be employed that offers advantages over the more simple random gathering of optical fibers. Generally, on panels whose front is covered with nonwoven arrays or with light emitting optical fiber fabrics, the optical fibers are wrapped around the edge of the panel and are gathered together on the back of the panel where they are directed to a light source means.

The optical fibers on the back of the light emitting panels may be gathered into an optical fiber bundle before being directed into a lightpipe and coupler portion of the optical fiber pathways. Optical fibers are made to enter the bundle in sweeping curves having no unnecessary back loops and having a minimum path length from their points of origin on the back of the panel to the bundle. The bundle is affixed to the panel surface with a fastener, glue or the like at the point where the bundle enters the lightpipe or coupler portion of the optical fiber pathway. A single panel may have more than one briaded optical fiber bundle which may be directed into more than one lightpipe and coupler means. A single panel may therefore be coupled to more than one light source means or more than one light source means may be mounted on the back of a panel.

The various arrangements of optical fiber bundles can be replaced by a lightpipe harness assembly on the back of a light emitting panel or along the edge of a light emitting fabric. Such a harness would connect small bundles of optical fibers with a light source located on the back of the panel, or with larger lightpipe cables that deliver light to the panel.

A novel "stacked lightpipe harness" is herein described which consists of a stack of glass or plastic rods, one rod for each small optical fiber bundle, which connect said bundles to a light source means. This type of harness can be made very inexpensively and may, in some cases, be less expensive than the optical fiber bundles described previously. This is particularly true if the stacked harness is made as a single unit of cast optical quality plastic.

Figure 28:
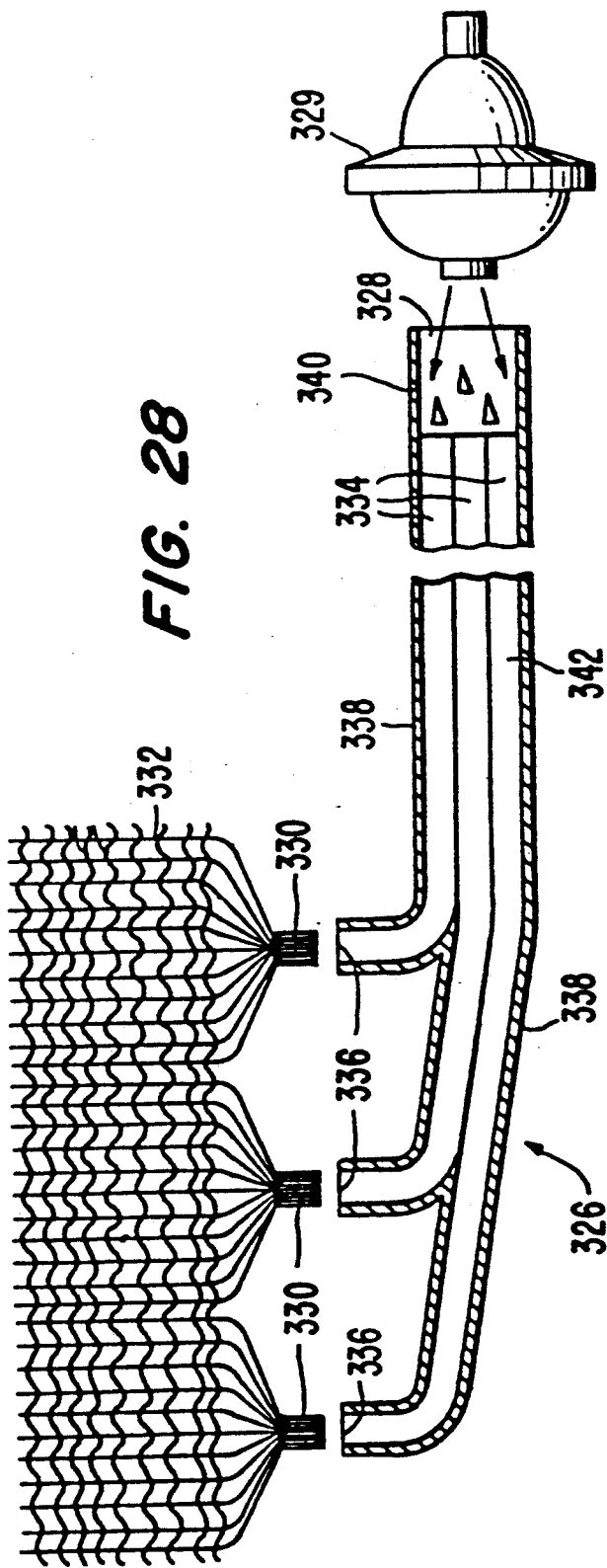
FIG. 28 is a partially sectional diagram of a lightpipe harness assembly for an optical fiber light emitting grid.

FIG. 28 is a diagrammatic illustration of a stacked lightpipe harness 326 constructed in accordance with the present invention. In this particular example, light is beamed into the input optical window 328 for the harness by the lightpipe illuminator bulb and focusing system 329 and exits the harness into several optical fiber bundles 330, each of which in turn feeds the light into a section of light emitting fabric 332. Light may also be beamed into the input optical window 328 by means of any other suitable light source or source of electromagnetic radiation. The optical fiber bundles 330 may be arranged along the edge of a geometric grid frame, a light emitting optical fiber panel of any type, or any other type of optical fiber lighting fixture means.

The stacked lightpipe harness 326 is formed of a number of plastic (or glass) rods 334 which may be circular in cross-section where they are fused at output windows 336 to an optical fiber bundle 330. The rods are then slowly changed in cross-section until they have a rectangular cross-section, but all positions along the rod maintain the same cross-sectional area so that the average angular divergence of the light passing through the rod remains unchanged. The system would work best if the rods were everywhere rectangular in cross-section and using the light source shown in FIG. 1. The individual plastic rods are bent, and may be twisted, so that they come together to form a stack of rectangular rods in which all the rods have the same height and width. The resulting stack has a width equal to the width of a single rod and a height equal to the combined height of the N rods (N=3 in this case). Within the stack, the individual plastic rods are bonded together with a transparent bonding means which allows this bonded region to have the same index of refraction as the rest of the plastic in the rods. However, the rods need not be bonded together. Instead, they may be loosely held together by the outer sheath, they may be wrapped by a low index of refraction plastic film or the cut plastic foam described earlier, or there may be a liquid lubricant between the rods having a low index of refraction. The entire arrangement of rods is then given a reflective coating 338 on its outside walls with the exception of its optical windows. This reflective coating could be a transparent substance having a relatively low index of refraction, or a reflective metallic film, or a combination thereof. A lightpipe diode device 340, may be built into the end of the harness 326 near the input optical window 328 as shown. The entire stacked lightpipe harness may be bent and/or twisted as needed to fit on the back of a light emitting panel.

Clearly the entire arrangement of rods 334 could be fabricated as a single molded plastic part if desired in any given application. However, for custom work, where only small numbers of harnesses are being fabricated, it would be desirable to make the harnesses from a series of separate bonded rods as needed. The rods could be heated to soften them and then bent to fit the panel or other application. The rods would then be bonded together, trimmed to length, the optical windows would be polished, and the harness would be affixed in place to the bundles 330.

The cross-sectional areas of the optical windows 328 and 336 are an important consideration of this novel harness design 326. This design features a relatively large input optical window 328 with the entire stacked rod portion 342 of the harness serving as an optical mixer. Light can therefore be focused through the central portion of this input optical window by a variety of optical devices without the need to provide misalignment mirrors or the like to capture stray light near the edge of the window. If the harness were composed of many optical fibers, the input optical window would have to be illuminated uniformly to insure uniform light input to all the optical fibers. In this stacked harness design, the input light can illuminate the input window non-uniformly. The optical mixer portion of the harness will insure that the light is distributed uniformly along the N rods according to their relative cross-sectional areas.

The output optical windows 336 of this stacked harness design are made with diameters equal to the diameters of the tightly packed ends of the optical fiber bundles 330. The output optical windows are each fused to the end of an optical fiber bundle with epoxy or the like. To improve the optical coupling even further, the claddings may be stripped from the optical fibers near the ends of the optical fiber bundles, and the ends of these bundles can then be heated slightly and compressed into a solid rod. The core portion of the optical fibers, the epoxy used to fuse a rod 334 to a bundle 330, and the plastic used in the harness rods 334 should all have the same index of refraction for maximum optical coupling. This junction region will then be given a reflective coating to prevent light leakage from the sides of the junction region. Since the harness rod 334 and optical fiber bundle 330 have the same diameter, the angular divergence of the light passing through this junction region is unchanged.

The stacked lightpipe harness 326 of FIG. 28 can be modified and adapted to many applications and circumstances. The portion of the harness near the input optical window 328 could be split lengthwise (horizontally in FIG. 28 starting at the right) into two or more branches so that two or more input optical windows are formed. In this way, two or more light sources could be attached to the same harness. As long as a sufficient length of harness remains having a full cross-sectional area to serve as an optical mixer, then the light from multiple light sources will be distributed uniformly among the output optical windows 336.

The stacked lightpipe harness 326 may have any number of lightpipe rods 334 and output optical windows 336. It is not necessary that these rods be circular in cross-section at their output optical windows for they may remain as rectangles having the same dimensions as the remainder of the rods, or they may have any other useful cross-sectional shape which conforms to the cross-sectional shape of a fiber bundle 330. The lightpipe rods need not all have the same cross-sectional area, for if the optical fiber bundles 330 have different diameters, then it would be advantageous for each lightpipe rod at the output window 336 to have the same cross-sectional area as the bundle it mates with. However, if the lightpipe rods have different cross-sectional areas, it would be of further benefit to have the rectangular portions of each rod vary in thickness according to the required cross-sectional area, but remain at some constant width so that the rods can still be conveniently stacked to form a larger rectangular rod as the body portion 342 of the lightpipe harness. The portions of the stacked lightpipe harness near the input or output windows may gradually flare outwardly or inwardly to cause the light to decrease or increase in angular divergence, but this is acceptable provided the light being beamed into each of the output optical windows is changed by the same amount.

Instead of connecting together the optical fiber bundles 330 of a single panel, grid, or light emitting fabric, the stacked light harness 326 may be used to connect together a series of panels, grids, or the like. It is often desirable to connect a number of separate light emitting panels, light emitting geometric grids, fiber optical lightpipe fixtures, or the like to one or more light sources. It is usually most convenient to employ a lightpipe harness 342 for this purpose whereby a single lightpipe, or bundle of lightpipes (which may have branches) is fitted with a series of male couplers, or female couplers, or both. A very important consideration in such lightpipe harnesses is that unlike electrical harnesses, where all input or output coupling means on the same wire have the same electrical potential, all positions along a lightpipe cable are not equal. For example, light traveling from a source means diminishes in intensity as portions of it are beamed into successive output branches. If a string of equal sized light emitting panels are to be connected to a single light source, then it would normally be desirable to divide all the available source light equally among all of the individual panels. If there are N panels, then each output coupler must be proceeded by a lightpipe divider means which splits off exactly 1/Nth of the available light to an individual panel. This process is complicated by the fact that the main lightpipe has different intensities of light at different positions along its length. The situation is further complicated by the usual requirement that in any given application, there may be any number of panels connected to the light source. Thus a set of dividers designed for one number of panels would not usually work for a different number of panels connected to a similar light source.

In FIG. 29, a new and unique lightpipe cable harness system 344 is illustrated which allows all the input light to be equally divided among any number of similar light emitting panels 346 connected to the same light source. Only one set of lightpipe divider means are needed for any number of panels, and this novel harness system does not increase the angular divergence of the light passing through the harness so that all panels receive light having the same angular divergence. As previously noted, the scatter of light out from a light emitting optical fiber device is highly dependant on the angular divergence of the light which enters the device. If, for example, the angular divergence increased along the harness, then each panel would receive a greater angular divergence and would therefore output its light with a different angular spread and perhaps a different intensity as well. The harness system 344 is a segmented lightpipe harness arrangement whereby the harness is built in segments, one segment per panel. These separate segments may be permanently affixed together at the time of manufacture to form a single integrated harness, or they may be manufactured as separate harness segments that are plugged together at the time of installation to form a harness of any desired length. Alternatively, the individual segments may be affixed one per panel so that the harness is assembled as the panels are connected side by side.

The individual lightpipe and sections of the harness 344 are made of solid optical quality transparent glass or plastic. These lightpipe rod segments are given a reflective coating 348 along all outside walls except for the optical windows 350 and 352 through which the light enters or leaves the rods. This reflective coating could be a relatively low index of refraction transparent coating which traps the light within the rod by means of total internal reflection, or it may be a metallic reflective coating, or combinations thereof. Light is input to this harness by means of a conventional optical fiber lightpipe and male coupler 354, or it is possible to connect the segmented lightpipe harness directly to the light source if desired. The first segment encountered by the light is simply a section of lightpipe rod 356 of any desired length. This section of lightpipe rod may be provided with bends and turns, and may have branches that lead to other segments of the harness. Its main function is to direct the light from the light source or light source lightpipe cable means to the beginning of the panel output segments of the harness. Additional sections of lightpipe rod may be inserted between panel output segments in applications where not all the panels are light emitting panels.

The section 356 of lightpipe rod directs its light flow into a segment of lightpipe 358 which is the same length as one light emitting panel. This segment has an optical branch 360 which splits off exactly one-third of the light and directs it into panel 346a as shown. Two-thirds of the light is made to continue to the next segment 362 having a branch 364 which splits off half of the remaining light and directs it into panel 346b. Then, all of the remaining light is beamed into the remaining segment 366 which does not contain an optical branch and simply beams all light received into panel 346c. The optical branches are of a very simple design which simply divides the cross-sectional area of the rod segment between the two legs of the branch; the ratio of areas thereby determining the ratio of light distribution between the two branches. After the branch, the two legs continue with reduced cross-sectional area as shown. The main branch terminates in an output optical window 350 which is made to butt up against the next section of the harness. Each harness section 358,362,366 begins with a lightpipe rod having the same standard cross-sectional area as the preceeding rod. The smaller rod output window 352 of a preceeding section always butts against the larger area input window 350 at the beginning of a section. Light thereafter passes from section to section without concern for misalignment problems. The only light losses at these junctions between sections are due to reflections which can be minimized by optical coatings.

The individual sections may be equipped with flanges 368 on either end which may be clamped or affixed to one another by any convenient mechanical method. Ideally, the clamping means would be simple to allow rapid coupling at a field site.

In each lightpipe harness section, the leg of the optical branch which leads into the panel, called the secondary branch, terminates in an optical mixer 370. The optical mixer has a cross-sectional area equal to or greater than the preceeding section of secondary branch rod. The transition between the secondary branch rod and the optical mixer element is abrupt, as shown, so that the angular divergence of the light entering this optical mixer remains unchanged. The optical mixer may contain optical diode means 372, and the cross-sectional area of the optical mixer is chosen to equal that of the associated optical fiber bundle 374 from the respective panel.

Color correction filters 376 may be placed between each optical mixer element and the associated optical fiber bundle. In preferred embodiments, each color filter is different, with the filter 376a being placed in the path of the light being beamed into the panel nearest the light source. Filter 376b is placed in the path of the light being beamed into the second panel from the light source, and filter 376c in the path of light being beamed to the panel farthest from the light source. Light passing through the harness will generally change in color due to selective absorption by the glass or plastic, and the color correction filters are used to counteract this selective color absorption. Since the light passing through filter 376a has traveled through the least amount of harness medium, this filter has the least amount of color correction; filter 376b has a greater amount of color correction; and filter 376c has the most color correction.

Light passing through a color correction filter 376 next passes into a length of optical fiber bundle 374 and is subsequently distributed among the light emitting optical fibers of the panel using methods discussed earlier. The individual lightpipe harness sections may be firmly affixed to each panel at the time of manufacture, or the harness sections may be provided with coupling means to be attached to each panel at a field site. If the harness sections are affixed to the panels at the factory, a low light loss bonding can be achieved at the junction between each harness section and the optical fiber bundle.

The secondary harness branch lines 360, 364, 370 may have their cross-sectional areas changed slowly along their length. This will cause a change in the angular divergence of the light passing through, but if all the cross-sectional areas are made to change by the same amount throughout the harness, it will change the light being beamed to all the panels by the same amount.

Each section of the harness will absorb some small percentage of the light passing therethrough. Therefore, if the two branch dividers 358 and 362 shown in FIG. 29 have ratios of exactly 66/33 and 50/58, the three secondary branches will not receive equal amounts of light intensity. If 10% of the light passing through a harness section is lost to absorption, then the two branched sections 358 and 362 should have ratios of 70/30 and 51/49 respectively (to the nearest whole number).

The harness 344 is shown to distribute light among a number of panels, but a smaller harness arrangement may be fabricated for use on the back of a single large panel, or along one edge of a large light emitting drapery, or the like. The segmented harness may be designed so that different intensities of light are distributed to different panels or output means. For example, it may be desirable to distribute less light to a cut panel than to a complete panel. The cross-section of the various lightpipe rods that make up the harness may be relatively varied to control the amount of light provided to any output unit.

The lightpipe harnesses, the optical fiber bundles, the light emitting panels, and the couplers, diodes, and other optical elements of this invention may be designed to transmit infrared, visible light, or ultraviolet light or any combination thereof. In order to reduce materials cost the lightpipe rods, harness segments, and connectors may be made hollow. In this case the transparent glass or plastic lightpipes should have a relatively high index of refraction and be coated on the outside surface with a relatively low index of refraction—transparent substance. A further outer coating of some reflective means should be applied, such as vacuum deposited aluminum.

In most lightpipe lighting fixture applications, it would be desirable to install an optical diode in or near the various coupler means employed. Such diodes would be positioned so that light may easily pass into said lighting fixtures but would be prevented from returning back toward the light source. Such diodes are also used in the harness structures of FIGS. 28 and 29. High precision optical diodes are not required in most lighting fixtures, since the intensity of light involved is relatively low and cost reduction is of prime concern.

Industrial Applicability

The flat panel illumination system 10 of the present invention is designed to provide illumination from a plurality of panel sections positioned side-by-side with other panel sections to form one continuous large panel having a substantially uniform light output. These panel sections may be illuminated from a single arc tube light source, and are particularly adapted for use in making thin signs that are back illuminated. The panels may also be used for billboards, wall panels, display panels, ceiling panels, ceiling lighting fixtures, clean room lighting fixtures, and liquid crystal back-lighting panels.

I claim:

1. A flat panel illumination system comprising light source means, light conducting cable means to conduct light from said light source means; and light emitting panel means connected to receive light conducted by said light conducting cable means, said light emitting panel means including a light emitting fabric means woven from light conducting fiber means, said light conducting fiber means being formed of multi-mode optical light conducting fibers which emit light conducted thereby due to the bending of said light conducting fibers woven in said light emitting fabric means, said light conducting fiber means extending in unwoven form outwardly from at least a first side of said light emitting fabric means, said light conducting fiber means being woven with spaced fill threads to form said light emitting fabric means, the spacing between said fill threads in said light emitting fabric means being progressively decreased as the distance from said first side increases.

2. A flat panel illumination system comprising a plurality of elongate light conducting fiber means, and a plurality of elongate fill fiber means, said elongate light conducting fiber means being woven with said fill fiber means to form a light emitting fabric means, said light conducting fiber means extending outwardly beyond at least a first side of said light emitting fabric means and being formed by multi-mode optical light conducting fibers which emit light conducted thereby due to the bending of the light conducting fibers woven into said light emitting fabric means, said light emitting fabric means being woven with an unbalanced weave wherein the spacing between said fill threads in said light emitting fabric is progressively decreased as the distance from said first side increases.

3. A flat panel illumination system comprising a plurality of elongate light conducting fiber means, and a plurality of elongate fill fiber means, said elongate light conducting fiber means being woven with said fill fiber means to form a light emitting fabric means, said light conducting fiber means extending outwardly beyond at least a first side of said light emitting fabric means and being formed by multi-mode optical light conducting fibers which emit light conducted thereby due to the bending of the light conducting fibers woven into said light emitting fabric means, said light emitting fabric means being woven with an unbalanced weave, the diameter of said fill threads being progressively increased as the distance from said first side increases.

4. A flat panel illumination system comprising a plurality of elongate light conducting fiber means, and a plurality of elongate fill fiber means, said elongate light conducting fiber means being woven with said fill fiber means to form a light emitting fabric means, said light conducting fiber means extending outwardly beyond at least a first side of said light emitting fabric means and being formed by multi-mode optical light conducting fibers which emit light conducted thereby due to the bending of the light conducting fibers woven into said light emitting fabric means, said light emitting fabric means being woven with an unbalanced weave, and reflector means mounted in spaced relationship to said light emitting fabric means and extending in substantially spaced, parallel relationship thereto, said reflector means having a corrugated reflective surface facing said light emitting fabric means, the corrugated surface having a plurality of grooves extending substantially parallel to said fill fiber means.

5. A flat panel illumination system comprising light source means, light conducting cable means to conduct light from said light source means; and light emitting panel means connected to receive light conducted by said light conducting cable means, said light emitting panel means including a light emitting fabric means woven from light conducting fiber means, said light conducting fibers means being formed of multi-mode optical light conducting fibers which emit light conducted thereby due to the bending of said light conducting fibers woven in said light emitting fabric means, said light conducting fiber means extending in unwoven form outwardly from at least a first side of said light emitting fabric means, said light conducting fiber means being woven with spaced fill threads to form said light emitting fabric means, the diameter of said fill threads being progressively increased as the distance from said first side increases.

6. A flat panel illumination system comprising a light emitting panel, at least one elongate light conducting cable means having a first end connected to said light emitting panel and a second end remote from said light emitting panel, said light conducting cable means being substantially rectangular in cross section and including an elongated outer sheath having first and second substantially parallel spaced sidewalls and first and second substantially parallel spaced edgewalls extending between said sidewalls and substantially perpendicular thereto, the distance between said edgewalls being greater than the distance between said sidewalls and said sidewalls and edgewalls defining a longitudinally extending chamber, said outer sheath further including laterally extending flange means extending from at least one of said first and second edgewalls and projecting outwardly therefrom substantially parallel to said first and second sidewalls, and a plurality of elongate optical fibers enclosed in said central chamber.

7. The flat panel illumination system of claim 6 wherein the distance between said first and second sidewalls is such that the thickness of said sheath is ⅜ inches or less.

8. The flat panel illumination system of claim 6 wherein said laterally extending flange means include first and second elongate flanges which extend from said first and second end walls respectively for substantially the length of said longitudinally extending chamber.

9. The flat panel illumination system of claim 6 wherein a light conducting coupling means which is substantially rectangular in cross section is connected to one end of said light conducting cable means.

10. The flat panel illumination system of claim 9 wherein said optical fibers extend beyond said elongated outer sheath into said coupling means, said optical fibers being bonded together within said coupling means to form a unitary rectangular rod configuration.

11. The flat panel illumination system of claim 9 wherein said coupling means includes a rectangular optical input aperture having an optical axis extending in a first plane and a heel section spaced from said optical input aperture and oriented to receive said optical fibers with the optical axis thereof in a second plane substantially perpendicular to said first plane, said optical fibers being configured within said coupling means to bend the optical axis thereof from said second plane to said first plane and to terminate at said optical input aperture.

12. A flat panel illumination system comprising a light emitting panel, at least one elongate light conducting cable means having a first end connected to said light emitting panel and a second end remote from said light emitting panel, said light conducting cable means including a cable sheath which defines a longitudinally extending chamber, a plurality of elongate light conducting optical fibers enclosed in said chamber, and a coupling means connected to one end of said light conducting cable means, said optical fibers extending beyond said chamber and cable sheath into said coupling means, said optical fibers being bonded together within said coupling means to form a unitary light conducting rod, each of said light conducting optical fibers including an outer cladding layer, said outer cladding layer being absent from the portions of said light conducting optical fibers which are bonded to form said unitary light conducting rod.

13. The flat panel illumination system of claim 12 which includes a light source means to provide light to said coupling means.

14. The flat panel illumination system of claim 13 wherein said light emitting panel is formed by a plurality of elongate light conducting fibers woven with a plurality of elongate fill fibers said elongate light conducting fibers operating to emit light conducted thereby due to the bending of the woven light conducting fibers, said light conducting fibers extending outwardly beyond at least a first side of said light emitting panel to receive light from said light conducting cable means.

15. The flat panel illumination system of claim 14 wherein said light conducting fibers extending outwardly beyond at least a first side of said light emitting panel extend into and through the chamber defined by said cable sheath.

16. A flat panel illumination system comprising a plurality of elongate light conducting fiber means, and a plurality of elongate fill fiber means, said elongate light conducting fiber means being woven with said fill fiber means to form a light emitting fabric means, said light conducting fiber means extending outwardly beyond at least a first side of said light emitting fabric means and being formed by multi-mode optical light conducting fibers which emit light conducted thereby due to the bending of the light conducting fibers woven into said light emitting fabric means, said light emitting fabric means being woven with an unbalanced weave wherein the weave of said light conducting fiber means is progressively varied as the distance from said first side increases to cause said light conducting fiber means to progressively emit more light as said light conducting fiber means extend away from said first side to thereby cause a more uniform light emission from said light emitting fabric means.

17. The flat panel illumination system of claim 16 which includes at least one elongate light conducting cable means having a first end connected to said light emitting fabric means and a second end remote from said light emitting fabric means, said light conducting cable means including a cable sheath, and a plurality of elongate light conducting optical fibers enclosed in said sheath, and a coupling means connected to the second end of said light conducting cable means, said optical fibers extending beyond said cable sheath into said coupling means.

18. The flat panel illumination system of claim 17 wherein each of said light conducting optical fibers includes an outer cladding layer, said outer cladding layer being absent from portions of said light conducting optical fibers which are within said coupling means, said portions of the light conducting optical fibers within said coupling means being bonded together to form a unitary light conducting rod.

19. The flat panel illumination system of claim 18 which includes light source means for providing light to said coupling means.

20. The flat panel illumination system of claim 19 wherein said light conducting cable means is rectangular in cross section.

21. The flat panel illumination system of claim 16 which includes light source means and light conducting cable means to conduct light from said light source means to said light emitting fabric means, said light conducting fiber means extending in unwoven form outwardly from said light emitting fabric means to form the light conducting cable means, said light conducting cable means having a light input end spaced from said light emitting fabric means, and coupling means is formed on the light input end of said light conducting cable means for connecting said light conducting cable means to said light source means.

22. The flat panel illumination system of claim 21 wherein said coupling means removably connects said light conducting cable means to said light source means.

23. The flat panel illumination system of claim 16 wherein said light emitting fabric means includes at least one light emitting surface, and a light transmitting means is positioned adjacent to said light emitting surface for transmitting light outwardly from said light emitting fabric means away from said light emitting surface thereof.

24. The flat panel illumination system of claim 23 wherein said light transmitting means is colored to emit colored light.

25. The flat panel illumination system of claim 23 which includes light source means and light conducting cable means to conduct light from said light source means to said light emitting fabric means, said light conducting fiber means extending in unwoven form outwardly from said light emitting fabric means to form the light conducting cable means, said light conducting fibers each including a light conducting core and an outer cladding surrounding the core, said light conducting cable means having a light input end spaced from said light emitting fabric means and coupling means formed on the light input end of said light conducting cable means for connecting said light conducting cable means to said light source means.

26. The flat panel illumination system of claim 25 wherein said coupling means includes a coupling light input end, said light source means being operative to provide light to said light conducting cable means through said light input end and said coupling means, said light source means including an electrically powered light unit for emitting light, a light source output end and light source reflector means positioned between said light unit and said light source output end for directing light from said light unit into the light input end of said coupling means.

27. The flat panel illumination system of claim 26 which includes mounting means to removably mount said coupling means, said mounting means operating to mount the light input end of said coupling means in spaced relationship to said light source output end.

28. The flat panel illumination system of claim 23 wherein said light transmitting means if formed to substantially encase said light emitting fabric means.

29. The flat panel illumination system of claim 28 wherein said light transmitting means is colored to emit colored light.

30. The flat panel illumination system of claim 28 wherein said light transmitting means is translucent.

31. The flat panel illumination system of claim 28 wherein said fill fiber means are spaced mono-filament fibers.

32. A flat panel illumination system comprising a plurality of elongate light conducting fiber means, and a plurality of elongate fill fiber means, said elongate light conducting fiber means being woven with said fill fiber means to form a light emitting fabric means, said light conducting fiber means extending outwardly beyond at least a first side of said light emitting fabric means and being formed by multi-mode optical light conducting fibers which emit light conducted thereby due to the bending of the light conducting fibers woven into said light emitting fabric means, said light emitting fabric means being woven with an unbalanced weave, the woven light conducting fiber means for said light emitting fabric means in a first area adjacent to said first side of said light emitting fabric means emitting an intensity of light which differs from the light intensity emitted by said light conducting fiber means in a second area of said light emitting fabric means directly adjacent to said first area.

33. A flat panel illumination system comprising a light emitting fabric having first and second opposed light emitting surfaces bordered by one or more sides and including a plurality of woven elongate, light conducting fiber means which operate to emit light conducted thereby due to bending of the elongate light conducting fiber means during weaving, said light emitting fabric being formed from said elongate light conducting fiber means which extend in a first direction away from a first side of said light emitting fabric and a plurality of spaced elongate fill fiber means which extend traversely of said elongate light conducting fiber means, said elongate light conducting fiber means being woven with said elongate fill fiber means, the spacing between said fill fiber means being decreased as the distance from said first side increases, said light conducting fiber means extending outwardly in nonwoven form beyond at least said first side of said light emitting fabric to transmit light thereto, and reflector means positioned adjacent to said first light emitting surface and extending substantially parallel thereto, said reflector means having a light reflective surface facing light emitting fabric to reflect light toward said second light emitting surface.

34. A flat panel illumination system comprising a light emitting fabric having first and second opposed light emitting surfaces and including a plurality of woven elongate, light conducting fiber means which operate to emit light conducted thereby due to bending of the elongate light conducting fiber means during weaving, said light conducting fiber means extending outwardly in nonwoven form beyond at least a first side of said light emitting fabric to transmit light thereto, reflector means positioned adjacent to said first light emitting surface and extending substantially parallel thereto, said reflector means having a light reflective surface facing said light emitting fabric to reflect light toward said second light emitting surface, and light transmitting means positioned adjacent to said second light emitting surface and extending substantially parallel thereto for transmitting light outwardly from said light emitting fabric away from the second surface thereof, said light emitting fabric extending between said reflector means and said light transmitting means and being formed from said elongate light conducting fiber means which extend in a first direction away from the first side of said light emitting fabric and a plurality of spaced, elongate fill fiber means which extend traversely of said elongate light conducting fiber means, said elongate light conducting fiber means being woven with said elongate fill fiber means, the weave of said elongate light conducting fiber means and elongate fill fiber means being varied as the distance from said first side increases to cause said light conducting fiber means to emit more light in areas spaced a distance from said first side to thereby obtain a more uniform light emission from said light emitting fabric.

35. The flat panel illumination system of claim 34 wherein said nonwoven light conducting fiber means extending outwardly from the first side of said light emitting fabric form a light transmitting cable having a light input end spaced from said light emitting fabric and coupling means formed on the light input end of said light transmitting cable for connecting said light transmitting cable to a light source.

36. The flat panel illumination system of claim 35 wherein said nonwoven light conducting fiber means are gathered together within said coupling means to form a light conducting rod.

37. The flat panel illumination system of claim 36 wherein said nonwoven light conducting fiber means each include an outer cladding layer, said outer cladding layer being absent from portions of said light conducting fiber means within said coupling means, said light conducting fiber means being bonded together within said coupling means to form a light conducting rod.

38. The flat panel illumination system of claim 35 wherein said coupling means removably connects said light transmitting cable both optically and physically to said light source, and said light conducting fiber means are gathered together within said coupling means to provide a compact, coupling light input end to receive light from said light source.

39. The flat panel illumination system of claim 35 which includes a light source means operative to provide light to said light transmitting cable through said coupling means, said light source means including an electrically powered light unit for emitting light and a light source reflector means for directing light from said light unit into said coupling means.

40. The flat panel illumination system of claim 39 wherein said light transmitting cable is enclosed in a cable sheath of non-light transmitting material.

41. The flat panel illumination system of claim 39 wherein said coupling means includes a coupling light input end, and said light source means includes a light source output end, said reflector means being positioned between said electrically powered light unit and said light source output end, and mounting means are provided to removably mount the coupling light input end in spaced relationship to said light source output end.

42. The flat panel illumination system of claim 41 wherein said light transmitting means is translucent.

43. The flat panel illumination system of claim 42 wherein said light transmitting means is colored to emit colored light.

44. The flat panel illumination system of claim 43 wherein said light transmitting means is formed to substantially encase said light emitting fabric and said reflector means.

45. The flat panel illumination system of claim 34 wherein said light transmitting means is formed to encase said light emitting fabric and said reflector means.

46. The flat panel illumination system of claim 34 wherein said elongate light conducting fiber means each includes a core having an index of refraction, said light transmitting means having an index of refraction which is equal to or greater than the index of refraction of the cores of said light conducting fiber means.

47. The flat panel illumination system of claim 34 wherein said elongate light conducting fiber means each includes a core having an index of refraction, said light transmitting means having an index of refraction which is less than the index of refraction of the cores for said light conducting fiber means.

48. The flat panel illumination system of claim 34 wherein said light transmitting means is translucent.

49. The flat panel illumination system of claim 34 wherein said light transmitting means is colored to transmit colored light.

50. The flat panel illumination system of claim 34 wherein an indicia bearing overlay is mounted over said light transmitting means, said light transmitting means extending between said second light emitting surface and said overlay.

* * * * *